US008407470B2

(12) United States Patent
Nakanishi et al.

(10) Patent No.: US 8,407,470 B2
(45) Date of Patent: Mar. 26, 2013

(54) CONTROL DEVICE AND CONTROLLED DEVICE

(75) Inventors: Toshiyuki Nakanishi, Fuchu (JP); Takafumi Sakamoto, Machida (JP); Keisuke Mera, Kawasaki (JP); Toshiyuki Umeda, Inagi (JP); Shoji Otaka, Yokohama (JP); Yusuke Doi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 966 days.

(21) Appl. No.: 12/364,109

(22) Filed: Feb. 2, 2009

(65) Prior Publication Data

US 2009/0195353 A1 Aug. 6, 2009

(30) Foreign Application Priority Data

Feb. 4, 2008 (JP) ................................ P2008-023923

(51) Int. Cl.
*H04L 9/00* (2006.01)
*G06F 7/04* (2006.01)

(52) U.S. Cl. ......... 713/168; 713/182; 341/173; 340/5.2; 340/5.8; 340/426.35; 340/426.36

(58) Field of Classification Search ................... 340/5.2, 340/5.8, 426.35, 426.36; 380/264, 270, 272; 713/168, 182; 455/410, 411, 420; 341/173
See application file for complete search history.

(56) References Cited

U.S. PATENT DOCUMENTS

| | | | | |
|---|---|---|---|---|
| 5,563,600 | A * | 10/1996 | Miyake | 341/173 |
| 5,774,550 | A * | 6/1998 | Brinkmeyer et al. | 713/168 |
| 6,304,968 | B1 * | 10/2001 | Hacker et al. | 713/153 |
| 6,525,643 | B1 * | 2/2003 | Okada et al. | 340/5.24 |
| 7,155,607 | B2 | 12/2006 | Yokota et al. | |
| 2003/0159041 | A1 * | 8/2003 | Yokota et al. | 713/168 |
| 2004/0056776 | A1 * | 3/2004 | Tsuji et al. | 340/825.72 |
| 2004/0070516 | A1 * | 4/2004 | Nielsen | 340/825.72 |
| 2005/0221805 | A1 * | 10/2005 | Koyano | 455/414.2 |

(Continued)

FOREIGN PATENT DOCUMENTS

| | | |
|---|---|---|
| EP | 1 339 189 A2 | 8/2003 |
| JP | 7-324532 | 12/1995 |

(Continued)

OTHER PUBLICATIONS

U.S. Appl. No. 12/501,650, filed Jul. 13, 2009, Sakamoto, et al.

(Continued)

*Primary Examiner* — Philip Chea
*Assistant Examiner* — Shanto M Abedin
(74) *Attorney, Agent, or Firm* — Oblon, Spivak, McClelland, Maier & Neustadt, L.L.P.

(57) ABSTRACT

A control device being a control device communicating with a controlled device to control the controlled device includes: a first memory to store first authentication information for authenticating the controlled device; a second memory to store second authentication information for making the controlled device authenticate itself; a determination unit to compare third authentication information sent from the controlled device for specifying the controlled device with the first authentication information; a calculator to perform calculation processing on the first authentication information or the third authentication information using the second authentication information to generate a calculated value; a transmitter to transmit, when the determination unit determines that the first authentication information and the third authentication information are the same, the calculated value to the controlled device; and a memory controller to update the first authentication information.

8 Claims, 15 Drawing Sheets

U.S. PATENT DOCUMENTS

| | | | | |
|---|---|---|---|---|
| 2006/0143463 | A1 * | 6/2006 | Ikeda et al. | 713/182 |
| 2006/0255910 | A1 * | 11/2006 | Fukushima et al. | 340/5.65 |
| 2008/0100491 | A1 * | 5/2008 | Umeda et al. | 341/176 |
| 2008/0270793 | A1 * | 10/2008 | Nowottnick | 713/168 |

FOREIGN PATENT DOCUMENTS

| | | |
|---|---|---|
| JP | 2003-318894 | 11/2003 |
| JP | 2004-107959 | 4/2004 |
| JP | 2005-45325 | 2/2005 |

OTHER PUBLICATIONS

U.S. Appl. No. 12/269,523, filed Nov. 12, 2008, Mera, et al.

William Allen Simpson, "PPP Challenge Handshake Authentication Protocol (CHAP)", Network Working Group, DayDreamer, Category: Standards Track, Aug. 1996, 14 Pages.

U.S. Appl. No. 12/364,061, filed Feb. 2, 2009, Sakamoto, et al.

Japanese Office Action issued Mar. 13, 2012, in Japan Patent Application No. 2008-023923 (with English translation).

* cited by examiner

CONTROL DEVICE AND CONTROLLED DEVICE

CROSS-REFERENCE TO RELATED APPLICATIONS

This application is based upon and claims the benefit of priority from the prior Japanese Patent Application No. 2008-023923, filed on Feb. 4, 2008; the entire contents of which are incorporated herein by reference.

BACKGROUND OF THE INVENTION

1. Field of the Invention

The present invention relates to a control device and a controlled device for remote-controlling a controlled object by using, for example, weak radio waves.

2. Description of the Related Art

A remote control system using weak radio waves has been in wide spread use for door locks of automobiles, automatic doors of parking lots, and the like. If an automobile door lock system is taken as an example, a transmitter (control device) provided in a key holder of a key of the automobile emits radio waves, and a controlled device of the automobile which received the radio waves can unlock the door lock (refer to, for example, JP-A 7-324532 (KOKAI)).

In such a remote control system, there is a need to control only a specific controlled object, so that an exchange of identification signals such as, for instance, IDs has to be carried out. However, if the IDs are simply transmitted, there is a risk that the radio waves are intercepted and the IDs are stolen, and the controlled object is controlled by a third person in an unauthorized manner.

Meanwhile, in the usage of the previously cited door lock of the automobile, there is a need that the transmitter to be operated by a user is made to be small. Further, since the controlled device has to be constantly in an operational state in preparation for the operation from the user, there is a problem that power consumption becomes large. The problem regarding power consumption is particularly important since the control device operated by the user is often driven by batteries. As described above, there is a problem in the conventional control device and controlled device that when the identification signals are intercepted, the controlled object may be controlled in an unauthorized manner. In addition, there is also a problem that the power consumption becomes large while the reduction in size is required.

SUMMARY OF THE INVENTION

The present invention has been made to solve such problems, and an object thereof is to provide a control device and a controlled device capable of preventing the unauthorized control while realizing the reduction in size and the power saving of the device.

In order to achieve the aforementioned object, a control device according to one aspect of the present invention being a control device communicating with a controlled device to control the controlled device includes: a first memory to store first authentication information for authenticating the controlled device; a second memory to store second authentication information for making the controlled device authenticate itself; a determination unit to compare third authentication information sent from the controlled device for specifying the controlled device with the first authentication information; a calculator to perform calculation processing on the first authentication information or the third authentication information using the second authentication information to generate a calculated value; a transmitter to transmit, when the determination unit determines that the first authentication information and the third authentication information are the same, the calculated value to the controlled device; and a memory controller to update the first authentication information.

Further, a controlled device according to another aspect of the present invention to perform a control in accordance with a control signal transmitted by a control device includes: a first memory to store first authentication information for activating the control device; a transmitter to repeatedly transmit the first authentication information read from the first memory; a second memory to store second authentication information for authenticating the control device; a calculator to generate a calculated value obtained by performing calculation processing on the first authentication information using the second authentication information; a determination unit to compare third authentication information sent from the control device in accordance with the reception of the first authentication information with the calculated value for performing the control when they match; and a memory controller to update the first authentication information stored in the first memory after the control is performed.

DESCRIPTION OF THE EMBODIMENTS

In embodiments of the present invention, it is possible to conduct a plurality of times of authentications and control of power supply with a simple method between a lock driving device (controlled device) driving a controlled object and a control device transmitting instructions from a user to the lock driving device. Hereinafter, the embodiments of the present invention will be specifically described with reference to the drawings by taking a case where a door lock of an automobile is remote-controlled, as an example.

Figure 1:
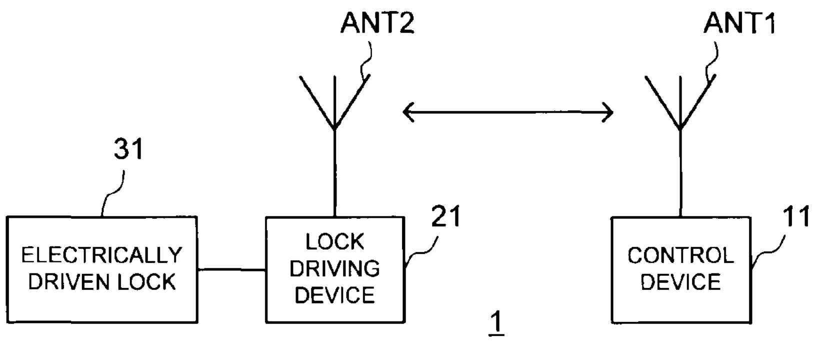
FIG. 1 is a block diagram showing a configuration of a control system according to a first embodiment of the present invention.

As shown in FIG. 1, the control system of this embodiment is provided with a control device 11 which emits a control signal for driving an electrically driven lock 31, and a lock driving device 21 as a controlled device which receives radio waves from the control device 11 to authenticate the control signal from the control device 11 and sends a driving signal to the electrically driven lock 31 being a controlled object.

The control device 11 is a transceiver carried and the like by a user instead of a key of an automobile. The control device 11 has a function of receiving radio waves from the lock driving device 21 when approaching the lock driving device 21 and the like, a function of generating the control signal in accordance with the radio waves, and a function of transmitting the control signal to the lock driving device 21. More specifically, the control device 11 has a function of starting driving power supply in response to a trigger signal transmitted from the lock driving device 21, and a function of generating and transmitting a response signal for responding to a trigger and challenge signal as a challenge signal for authentication. The lock driving device 21 has a function of repeatedly transmitting a periodical trigger and challenge signal to the control device 11, a function of receiving the response signal transmitted by the control device 11 in response to the trigger and challenge signal, a function of authenticating whether the response signal is from a correct control device, and a function of generating a driving signal when the signal is authenticated to be a correct control signal. The electrically driven lock 31 is, for instance, an automobile door lock mechanism which realizes a predetermined operation such as releasing of the door lock based on the driving signal transmitted from the lock driving device 21.

Next, the operation of the control system according to the first embodiment will be described in detail with reference to FIG. 2. In this embodiment, common key codes Ka and Kb and an initial value R0 of the trigger and challenge signal to be transmitted by the lock driving device 21 are previously assigned to the lock driving device 21 and the control device 11, and are stored in storage units provided in the respective devices.

Figure 2:
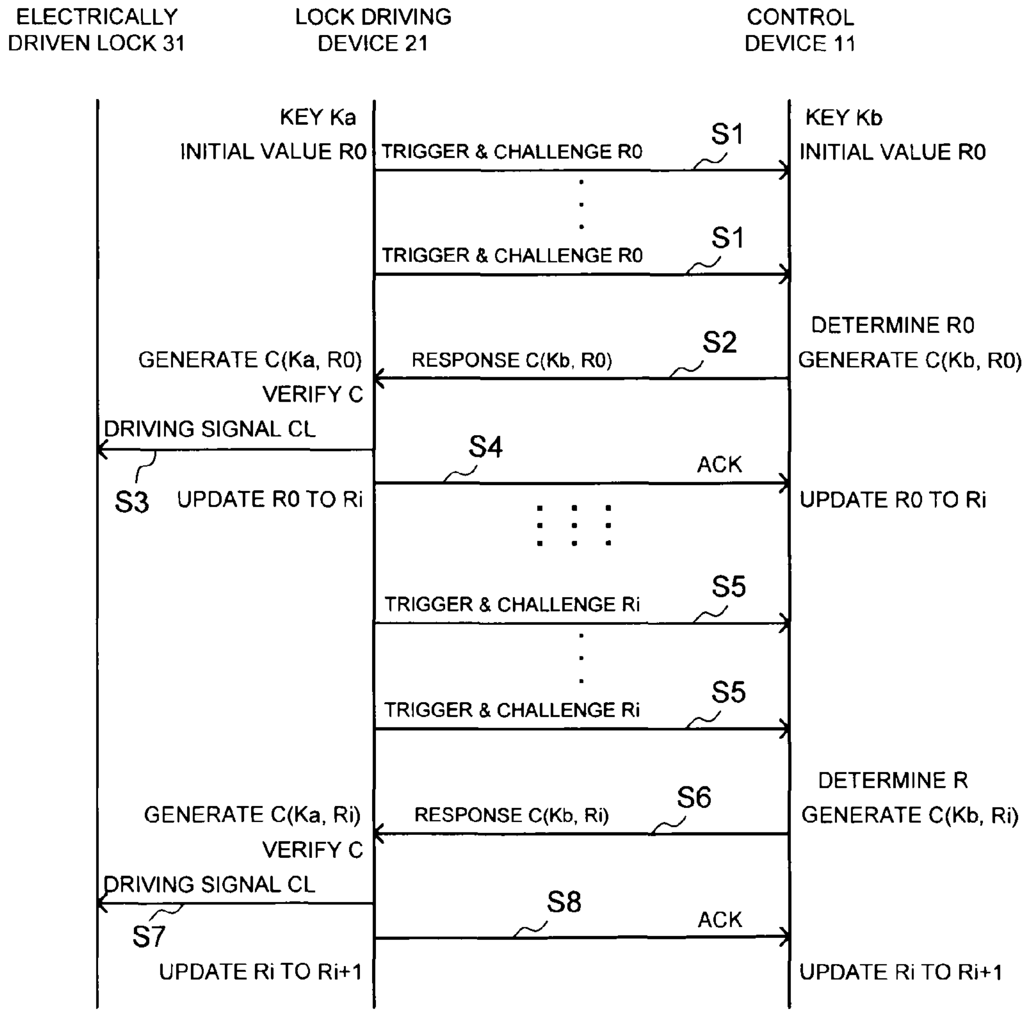
FIG. 2 is a view showing an operation sequence of the control system according to the first embodiment.

As shown in FIG. 2, the lock driving device 21 is repeatedly transmitting the trigger and challenge signal (hereinafter, referred to as "trigger signal") including predetermined length of trigger information R0 (step 1, hereinafter, referred to as "S1"). When a user carrying the control device 11 approaches the lock driving device 21, the control device 11 receives the trigger signal, and determines whether the received trigger signal is the correct one. When the trigger signal is the correct one, the control device 11 turns its main power supply on, generates a calculated value C(Kb, R0) by calculating (encrypting) the received trigger signal using an encryption key Kb stored in itself, and transmits the value to the lock driving device 21 as the response signal (S2).

Upon receiving the calculated value C (Kb, R0) as the response signal, the lock driving device 21 stops the transmission of trigger signal, and generates a calculated value C (Ka, R0) by calculating the trigger signal R0 using an encryption key Ka stored in itself. After generating the calculated value C, the lock driving device 21 compares the received calculated value C (Kb, R0) with the calculated value C (Ka, R0) generated by itself, to thereby verify the value. Here, if it is set that the keys Kb and Ka respectively stored in the control device 11 and the lock driving device 21 are the same, and calculation formulas for the encryption are in common, the same calculated value C can be obtained, so that when a combination of the control device 11 and the lock driving device 21 is correct, the comparison result becomes the same.

If the respective calculated values C are the same as a result of comparison, the lock driving device 21 authenticates that the control device 11 is the correct opponent, and generates a driving signal CL to send to the electrically driven lock 31 (S3). In addition, the lock driving device 21 returns an acknowledgement signal ACK to the control device 11 (S4). Upon receiving the driving signal CL, the electrically driven lock 31 performs a predetermined operation. After completing the transmission/reception of ACK, each of the control device 11 and the lock driving device 21 updates the trigger signal (trigger information). The update of trigger information is respectively conducted by generating new trigger information using the common calculation formula and storing the information. In an example shown in FIG. 2, the trigger information is updated from the initial value R0 to newer value $R_1$, . . . from the value $R_{i-1}$ to the value $R_i$, and the like.

When the trigger information is updated to $R_i$, the lock driving device 21 starts a repetitive transmission of the trigger information $R_i$ as the trigger signal (S5). The time until which the repetitive transmission is started is arbitrarily set. When the user carrying the control device 11 approaches the lock driving device 21 again, the control device 11 receives the trigger signal and determines whether the received trigger signal is the correct one. When the trigger signal is the correct one, the control device 11 turns its main power supply on, generates a calculated value C (Kb, $R_i$) by calculating (encrypting) the received trigger signal using the encryption key Kb stored in itself, and transmits the calculated value C(Kb, $R_i$) to the lock driving device 21 as a response signal (S6).

Upon receiving the calculated value C as the response signal, the lock driving device 21 generates a calculated value C(Ka, $R_i$) by calculating the updated trigger signal R using the encryption key Ka stored in itself. After generating the calculated value C, the lock driving device 21 compares the received calculated value C (Kb, $R_i$) with the calculated value C (Ka, $R_i$) generated by itself, to thereby verify the value. As a result of comparison, if the respective calculated values C are the same, the lock driving device 21 authenticates that the control device 11 is the correct opponent, and generates a driving signal CL to send it to the electrically driven lock 31 (S7). In addition, the lock driving device 21 returns an acknowledgement signal ACK to the control device 11 (S8). Upon receiving the driving signal CL, the electrically driven lock 31 performs a predetermined operation. After completing the transmission/reception of ACK, each of the control device 11 and the lock driving device 21 further calculates the trigger information $R_i$ to update it to $R_{i+1}$.

As described above, in the control system of this embodiment, the lock driving device repeatedly transmits the trigger and challenge signal and the control device receiving the signal transmits the response signal, which enables to reduce the power consumption at the control device side. Further, in the control system of this embodiment, the control device calculates the response signal using the key common to the lock driving device and returns the signal to the lock driving device, so that it is possible to enhance the security. Furthermore, since the trigger and challenge signal is updated by each of the lock driving device and the control device using the common calculation formula and the like, at every time the control is conducted, it is possible to prevent an unauthorized access caused by the interception of radio waves.

Specifically, in the control system of this embodiment, the data generated in the previous sequence is used as the next trigger signal, so that a double authentication in addition to the authentication using the keys Ka, Kb can be performed. Particularly, in the control system of this embodiment, since the main power supply of the control device is controlled based on the trigger signal, it is possible to reduce the chance of causing a malfunction and power consumption due to unwanted radio waves.

Note that in this embodiment, the trigger signal is changed at every time the control operation is performed, but, this is not limited thereto. An inherent identification signal may be included in the trigger signal so as to add data obtained in the previous sequence additionally. In this case, three times of authentication in total can be realized, and even if the data obtained in the previous sequence is eliminated due to some problems, the sequence can be recovered using the identification signal.

Figure 3:
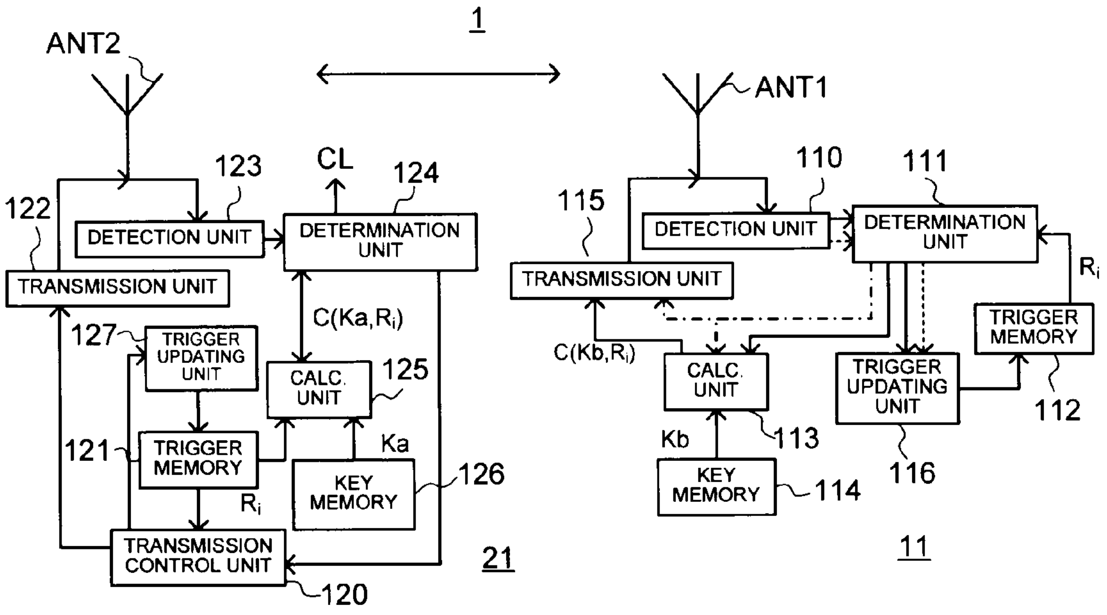
FIG. 3 is a block diagram showing a configuration of the control system according to the first embodiment.
Figure 4:
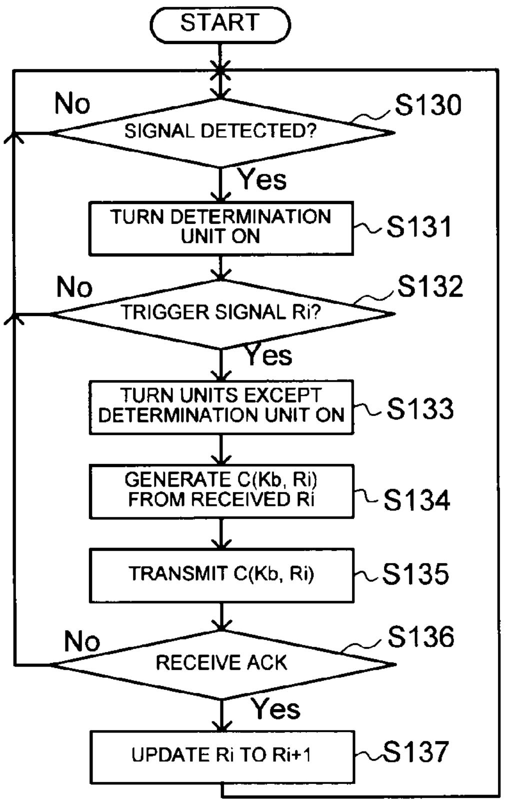
FIG. 4 is a flow chart showing an operation of a control device according to the first embodiment.
Figure 5:
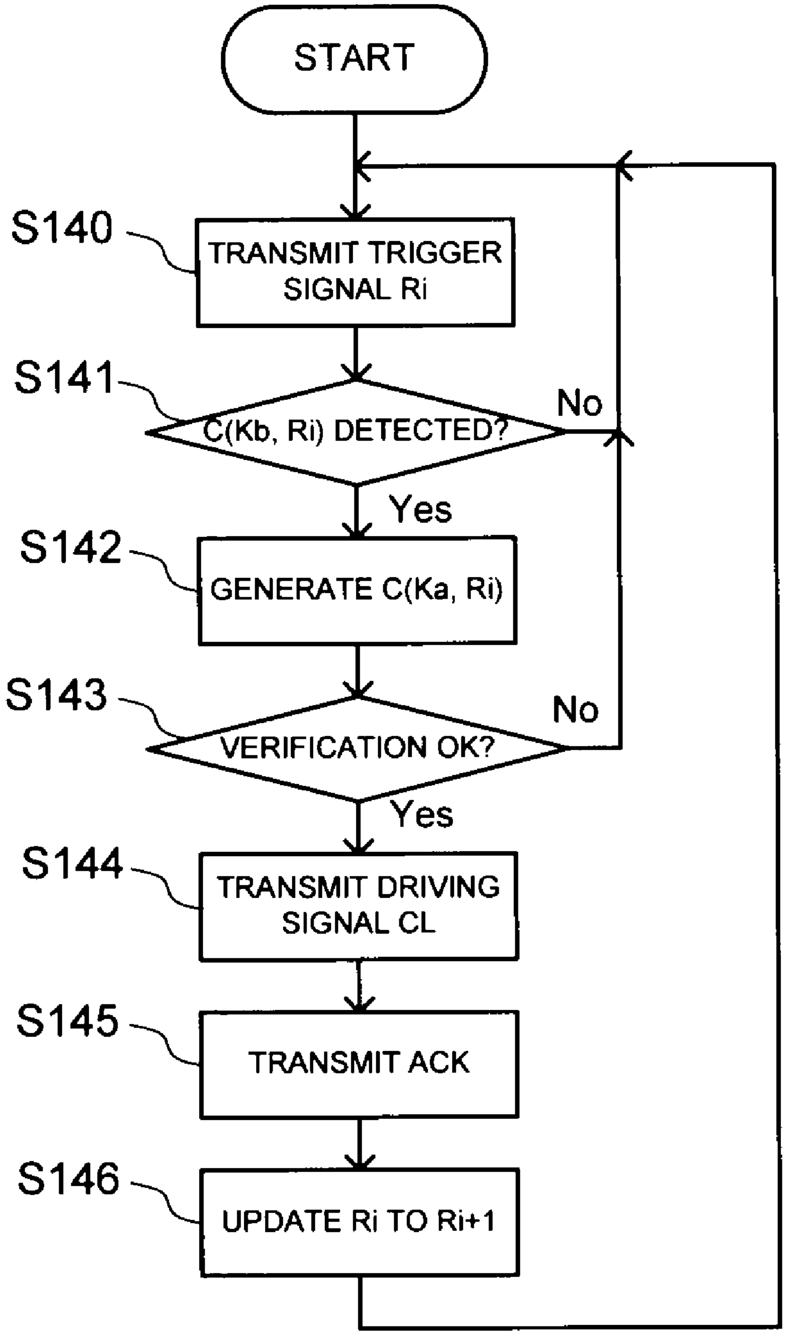
FIG. 5 is a flowchart showing an operation of a lock driving device according to the first embodiment.

Next, by using FIG. 3 to FIG. 5, the control device 11 and the lock driving device 21 according to the control system of this embodiment will be described in detail. As shown in FIG. 3, the control device 11 of this embodiment includes an antenna ANT1, a detection unit 110, a determination unit 111, a trigger memory 112, a calculation unit 113, a key memory 114, a transmission unit 115, and a trigger updating unit 116.

The antenna ANT1 is an antenna used when the control device 11 communicates with the lock driving device 21. The detection unit 110 includes a demodulator and the like, and demodulates a signal received from the lock driving device 21 via the antenna ANT1. The detection unit 110 has a function of detecting radio waves and controlling power supply to the determination unit 111, in addition to a function as a demodulator for demodulating the received signal. Specifically, upon detecting the radio waves, the detection unit 110 supplies power to the determination unit 111 (dotted line in the drawing), and also sends the demodulated signal to the determination unit 111. As a result of this, it becomes possible to supply power only to the detection unit 110 until when the radio waves are detected, which enables to reduce the power consumption of the entire control device 11. Since an amplitude modulation based method is used as a modulation method in the control system of this embodiment, it is possible to apply a detection method such as a diode detection in which a received signal is converted into a direct current.

The determination unit 111 determines whether or not the trigger signal demodulated by the detection unit 110 is from the correct lock driving device 21. Concretely, the determination unit 111 reads data (the trigger information R updated in the previous sequence or the initial value R0 of the trigger signal) stored in the trigger memory 112, compares the data with the trigger information of the demodulated trigger signal, and determines whether or not they match. If they match as a result of comparison, the determination unit 111 determines that the trigger signal is from the correct lock driving device.

In addition, if they match as a result of comparison, the determination unit 111 supplies power to the calculation unit 113 and the transmission unit 115 (dashed line in the drawing). Specifically, in this embodiment, two stages of power control, namely, a power control based on presence/absence of detection of radio waves performed by the detection unit 110 and a power control based on the correctness of the trigger signal determined by the determination unit 111, are realized. Accordingly, it is possible not only to reduce the power consumption as a whole but also to reduce unnecessary power consumption caused by an unintended detection of radio waves, an unauthorized transmission of radio waves from a third person, and the like.

The trigger memory 112 is a nonvolatile memory storing trigger information (authentication information) for determining whether the received trigger signal is from the correct lock driving device 21. The trigger memory 112 stores the initial value R0 at an initial stage, but, contents thereof are updated by each sequence by the later-described trigger updating unit 116.

The calculation unit 113 has a function of executing calculation processing (encryption processing) on the trigger information $R_i$ of the trigger signal received and demodulated by the detection unit 110 and the determination unit 111 using the key Kb read from the key memory 114, and sending the obtained calculated value C (Kb, $R_i$) to the transmission unit 115. The key memory 114 stores key information Kb of the control device 11 and gives the key Kb to the calculation unit 113 when the calculation unit 113 performs the calculation processing.

The transmission unit 115 has a local signal oscillator, a modulator, an amplifier and the like, and transmits the calculated value C (Kb, $R_i$) as the response signal to the lock driving device 21 using radio waves of predetermined frequencies. As a modulator of the transmission unit 115, the one with a simple structure such as amplitude modulation is suitably used, for example. In order to reduce the power consumption, it is also possible to stop the supply of power to the respective elements composing the transmission unit 115, except when the transmission is conducted.

The trigger updating unit 116 updates, after the authentication with the lock driving device 21 is successfully conducted, the trigger information $R_i$ of the trigger signal to be used in the next authentication sequence. Concretely, the trigger updating unit 116 generates new trigger information $R_{i+1}$ by performing a predetermined calculation on the trigger information $R_i$ stored in the trigger memory 112, to thereby update the trigger information stored in the trigger memory 112.

Hereinafter, an operation of the control device 11 of this embodiment will be explained with reference to FIG. 2 to FIG. 4. The detection unit 110 is constantly provided with power, and it is in a state of awaiting radio waves from the lock driving device 21 (S130). When the user carrying the control device 11 approaches the lock driving device 21 and enters an effective coverage area of the radio waves from the lock driving device 21 (Yes in S130), the detection unit 110 activates the determination unit 111 by starting the supply of power thereto (S131).

When activated, the determination unit 111 compares the trigger information included in the trigger signal received by the detection unit 110 with the trigger information $R_i$ in the trigger memory 112, to thereby determine whether the trigger signal is from the correct lock driving device 21 (S132). If the trigger signal is not the correct one as a result of determination, the determination unit 111 stops its operation (No in S132). If the trigger signal is the correct one as a result of determination (Yes in S132), the determination unit 111 starts the supply of power to the other functional elements such as the calculation unit 113, the transmission unit 115 and the trigger updating unit 116 (S133). In addition, the determination unit 111 sends the trigger information $R_i$ on the received trigger signal to the calculation unit 113.

When being turned on, the calculation unit 113 performs a predetermined calculation on the received trigger information $R_i$ to encrypt it by using the key information Kb (key Kb) read from the key memory 114 (S134). The calculation unit 113 sends the encrypted trigger information $R_i$ (hereinafter, referred to as calculated value $C(Kb, R_i)$) to the transmission unit 115, and the transmission unit 115 transmits the received calculated value $C(Kb, R_i)$ to the lock driving device 21 (S135).

After the calculated value C is transmitted, the determination unit 111 stands ready to receive an ACK signal from the lock driving device (S136). After the ACK signal is received, the trigger updating unit 116 performs a predetermined calculation on the trigger information $R_i$ stored in the trigger memory 112, and stores the calculation result in the trigger memory 112 as new trigger information $R_{i+1}$ (S137).

In the next operation and thereafter, the determination unit 111 reads the trigger information $R_{i+1}$ updated by the trigger updating unit 116 from the trigger memory 112, and determines whether or not the information is correct by comparing the information with trigger information $R_{i+1}$ of the trigger signal sent from the lock driving device 21 (S130 to S132).

As described above, according to the control device of this embodiment, since the trigger information $R_i$ used for the determination of the trigger signal in the previous sequence is updated by each sequence, even if the trigger signal is intercepted, it is possible to reduce the chance of the unauthorized control of the device.

Next, the lock driving device 21 will be explained. As shown in FIG. 3, the lock driving device 21 according to this embodiment includes a transmission control unit 120, a trigger memory 121, a transmission unit 122, a detection unit 123, a determination unit 124, a calculation unit 125, a key memory 126 and a trigger updating unit 127.

The transmission control unit 120 has a function of controlling a transmission operation of the lock driving device 21. Concretely, the transmission control unit 120 generates a periodical trigger signal using trigger information read from the trigger memory 121. Further, the transmission control unit 120 sends the generated periodical trigger signal to the transmission unit 122 and controls the transmission of trigger signal to the control device 11. The trigger memory 121 corresponds to the trigger memory 112 of the control device 11, and is a nonvolatile memory storing the trigger information included in the trigger signal for activating and authenticating the control device 11. The trigger memory 121 stores the initial value R0 at an initial stage, but, contents thereof are updated by each sequence by the later-described trigger updating unit 127. The transmission unit 122 receives a trigger signal $R_i$ from the transmission control unit 120, performs predetermined modulation on the signal, and transmits it via the ANT1. Further, the transmission unit 122 transmits the ACK signal based on an instruction from the transmission control unit 120.

The detection unit 123 has a demodulator and the like, and demodulates the response signal (calculated value C) received from the control device 11 via an antenna ANT2. The detection unit 123 may also have a function of detecting radio waves and controlling the power supply to the determination unit 124, in addition to a function as a demodulator for demodulating the received signal.

The determination unit 124 determines whether or not a response signal C demodulated by the detection unit 123 is from the correct control device 11. Concretely, upon receiving the response signal (here, the calculated value $C(Kb, R_i)$), the determination unit 124 receives, from the calculation unit 125, a calculated value $C(Ka, R_i)$ obtained by encrypting the trigger information $R_i$ stored in the trigger memory 121 using key information Ka stored in the key memory 126, and compares it with the received calculated value $C(Kb, R_i)$. When they match, the determination unit 124 generates the driving signal CL for controlling the electrically driven lock 31. Specifically, the determination unit 124 generates the driving signal CL when the response signal is the correct one. Since the trigger signal corresponding to the response signal is the previously determined initial value R0 or the value $R_i$ updated in the previous sequence, a double authentication is realized for control of the lock driving device being the controlled object.

The calculation unit 125 executes calculation processing (encryption processing) on the trigger information $R_i$ stored in the trigger memory 121 using the key Ka read from the key memory 126. The calculation unit 125 corresponds to the calculation unit 113, and executes the calculation processing using a common calculation formula. Therefore, if the trigger information R and the keys Ka and Kb being objects of calculation are in common, the calculation units 113 and 125 generate the same calculated value C. The key memory 126 corresponds to the key memory 114, and stores the key information used when the calculation unit 125 performs encryption calculation.

The trigger updating unit 127 corresponds to the trigger updating unit 116, and updates, after the authentication with the lock driving device 21 is successfully conducted, the trigger information $R_i$ of the trigger signal to be used in the next authentication sequence to $R_{i+1}$. The trigger updating unit 127 generates new trigger information through the calculation common to the trigger updating unit 116, and updates the trigger information $R_i$ stored in the trigger memory 121 to $R_{i+1}$.

Hereinafter, an operation of the lock driving device 21 of this embodiment will be described with reference to FIG. 2, FIG. 3 and FIG. 5. The transmission control unit 120 reads the trigger information $R_i$ from the trigger memory 121, generates the periodical trigger signal, and sends it to the transmission unit 122. The transmission unit 122 repeatedly transmits the sent trigger signal via the antenna ANT2 (S140).

In order to detect radio waves from the control device 11, the detection unit 123 is always in a standby state (S141). Upon detecting the radio waves from the control device 11 (Yes in S141), the detection unit 123 activates the determination unit 124 by supplying power thereto, and sends the demodulated received signal (received information) to the determination unit 124. The determination unit 124 activates by receiving the supply of power, and requests the calculation unit 125 to perform the encryption calculation on the trigger information $R_i$. Upon receiving the request, the calculation unit 125 generates the calculated value $C(Ka, R_i)$ by encrypting the trigger information $R_i$ stored in the trigger memory 121 using the key Ka stored in the key memory 126, and returns the value to the determination unit 124 (S142).

The determination unit 124 compares the received information (here, $C(Kb, R_i)$) received from the detection unit 123 with the calculated value $C(Ka, R_i)$ received from the calculation unit 125 (S143). If they match as a result of comparison (Yes in S143), the determination unit 124 generates the driving signal CL and sends it to the electrically driven lock 31 (S144). Further, the transmission control unit 120 stops the transmission of trigger information for a certain period of time.

After transmitting the driving signal CL, the determination unit 124 instructs the transmission control unit 120 to transmit the ACK, and the transmission control unit 120 transmits the ACK through the transmission unit 122 (S145). After transmitting the ACK, the transmission control unit 120 instructs the trigger updating unit 127 to update the trigger information $R_i$, and the trigger updating unit 127 performs predetermined calculation processing on the trigger information $R_i$ stored in the trigger memory 121, and writes back the calculation result to the trigger memory 121. Accordingly, the trigger information $R_i$ in the trigger memory 121 is updated to $R_{i+1}$ (S146).

In the next operation, the calculation unit 125 performs calculation processing on the updated trigger information $R_{i+1}$, and the determination unit 124 determines whether the received information is from the correct control device by using a new calculated value C (Ka, $R_{i+1}$).

As described above, according to the lock driving device 21 of this embodiment, since the trigger signal from the control device 11 is determined to be correct or not, a double authentication can be realized. Further, in the lock driving device 21 of this embodiment, it is also possible to control the power supply to the other circuit elements based on the correctness of the trigger signal, so that it is possible to prevent a malfunction caused by unwanted radio waves from the outside or unauthorized radio waves, and to reduce the power consumption.

Figure 6:
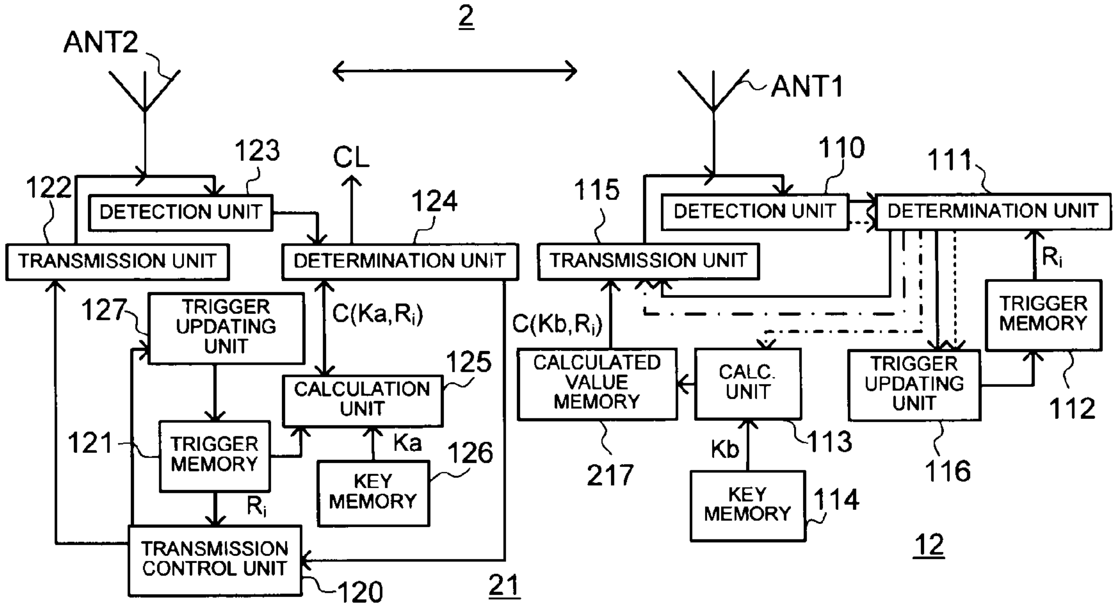
FIG. 6 is a block diagram showing a configuration of a control system according to a second embodiment of the present invention.
Figure 7:
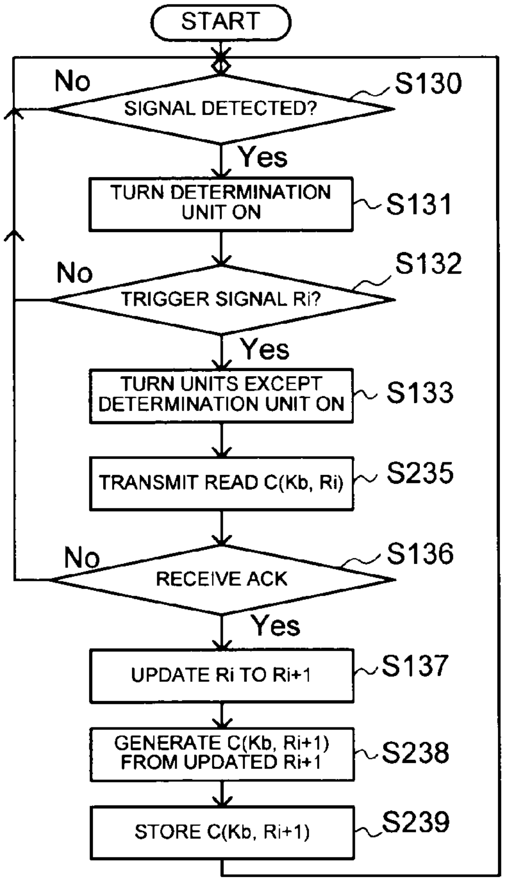
FIG. 7 is a flow chart showing an operation of a control device according to the second embodiment.

Subsequently, a control system according to a second embodiment of the present invention will be described in detail with reference to FIG. 6 and FIG. 7. In an explanation hereinbelow, configurations and operations common to the first embodiment are given the same reference numerals, and an overlapped explanation thereof will be omitted. As shown in FIG. 6, a control device 12 of this embodiment corresponds to the control device 11 according to the first embodiment shown in FIG. 3 with which a calculated value memory 217 storing the calculation result of the calculation unit 113 is further provided.

The calculated value memory 217 is a nonvolatile memory storing the calculated value C (Kb, $R_i$) being the calculation result of the calculation unit 113. In the control system of this embodiment, the control device 12 stores, in addition to the trigger information $R_i$ for determining the correctness of the next trigger signal, a calculated value C (Kb, $R_{i+1}$) to be the next response signal. Specifically, the control device 12 receiving the trigger signal does not generate the calculated value C at every reception of the signal, but, it transmits the calculated value C stored in the previous sequence as the response signal. Accordingly, a speed-up of operation is realized by reducing a time lag from the reception of trigger signal to the transmission of response signal.

Hereinafter, the operation of the control device 12 of this embodiment will be described with reference to FIG. 6 and FIG. 7. The steps until when the detection unit 110 supplies power to the determination unit 111 by receiving radio waves and the determination unit 111 determines the correctness of the trigger signal are common to those of the control device 11 according to the first embodiment (S130 to S132). If the trigger signal is not the correct one as a result of determination, the determination unit 111 stops its operation (No in S132). If the trigger signal is the correct trigger signal $R_i$ as a result of determination (Yes in S132), the determination unit 111 starts the supply of power to the other functional elements such as the calculation unit 113, the transmission unit 115 and the trigger updating unit 116 (S133). In addition, the determination unit 111 instructs the transmission unit 115 to transmit the response signal, and the transmission unit 115 reads the calculated value C (Kb, $R_i$) from the calculated value memory 217 to transmit it via the antenna ANT1 (S235).

After the calculated value C is transmitted, the determination unit 111 stands ready to receive the ACK signal from the lock driving device (S136). After receiving the ACK signal, the determination unit 111 instructs the trigger updating unit 116 to update the trigger information, and also instructs the calculation unit 113 to calculate a new calculated value C for the next sequence. The trigger updating unit 116 performs a predetermined calculation on the trigger information $R_i$ stored in the trigger memory 112, and stores the calculation result in the trigger memory 112 as new trigger information $R_{i+1}$ (S137). Further, the calculation unit 113 reads the updated trigger information from the trigger memory 112, generates the new calculated value C (Kb, $R_{i+1}$) by encrypting the trigger information using the key Kb stored in the key memory 114 (S238), and writes the generated calculated value C(Kb, $R_{i+1}$) to the calculated value memory 217 (S239).

In the next operation and thereafter, the determination unit 111 reads the trigger information $R_{i+1}$ updated by the trigger updating unit 116 from the trigger memory 112, and determines whether or not the information is correct by comparing the information with the trigger information $R_{i+1}$ of the trigger signal sent from the lock driving device 21 (S130 to S132). If the trigger signal is the correct one, the transmission unit 115 reads the calculated value C (Kb, $R_{i+1}$) newly generated by the calculation unit 113 from the calculated value memory 217, and transmits it as the response signal.

According to the control device of this embodiment, since the trigger information used for the determination of the trigger signal in the previous sequence is updated by each sequence, even if the trigger signal is intercepted, it is possible to reduce the chance that the device is controlled in an unauthorized manner. Further, in the control device of this embodiment, since there is no need to perform calculation processing during a period of time from the determination of trigger signal to the transmission of response signal, it is possible to speed up the operation.

Figure 8:
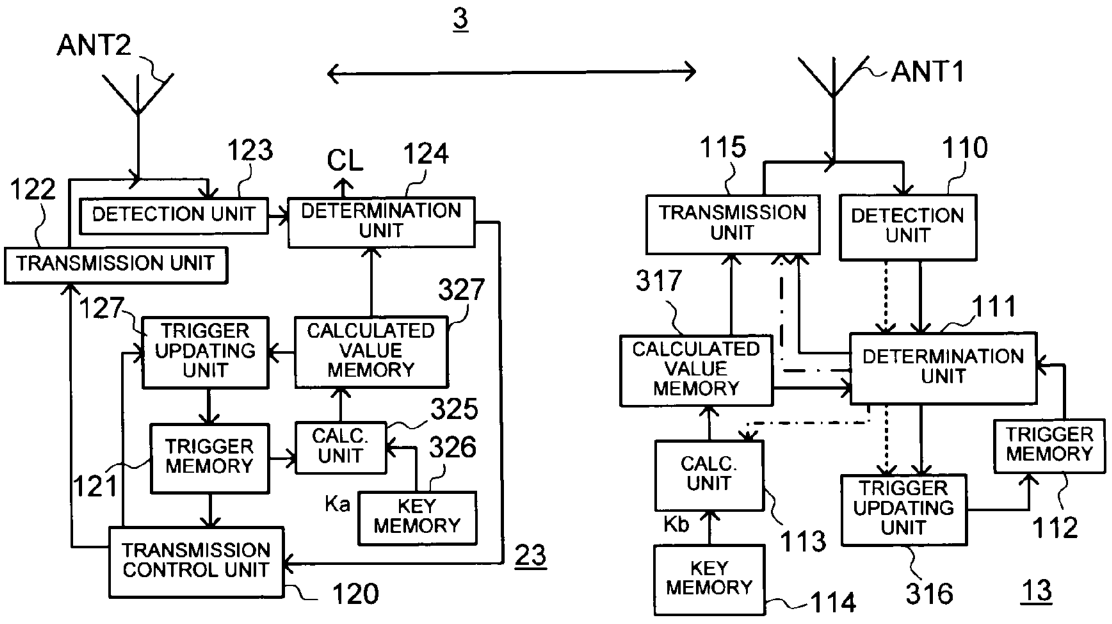
FIG. 8 is a block diagram showing a configuration of a control system according to a third embodiment of the present invention.
Figure 9:
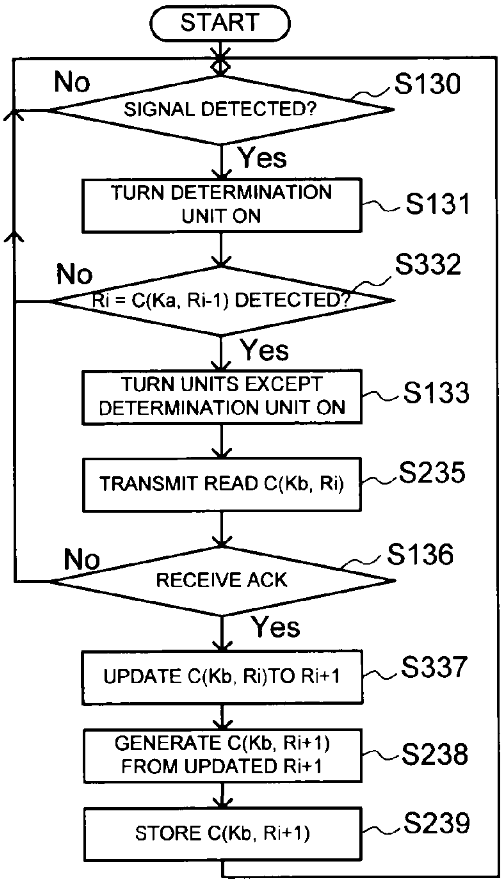
FIG. 9 is a flow chart showing an operation of a control device according to the third embodiment.
Figure 10:
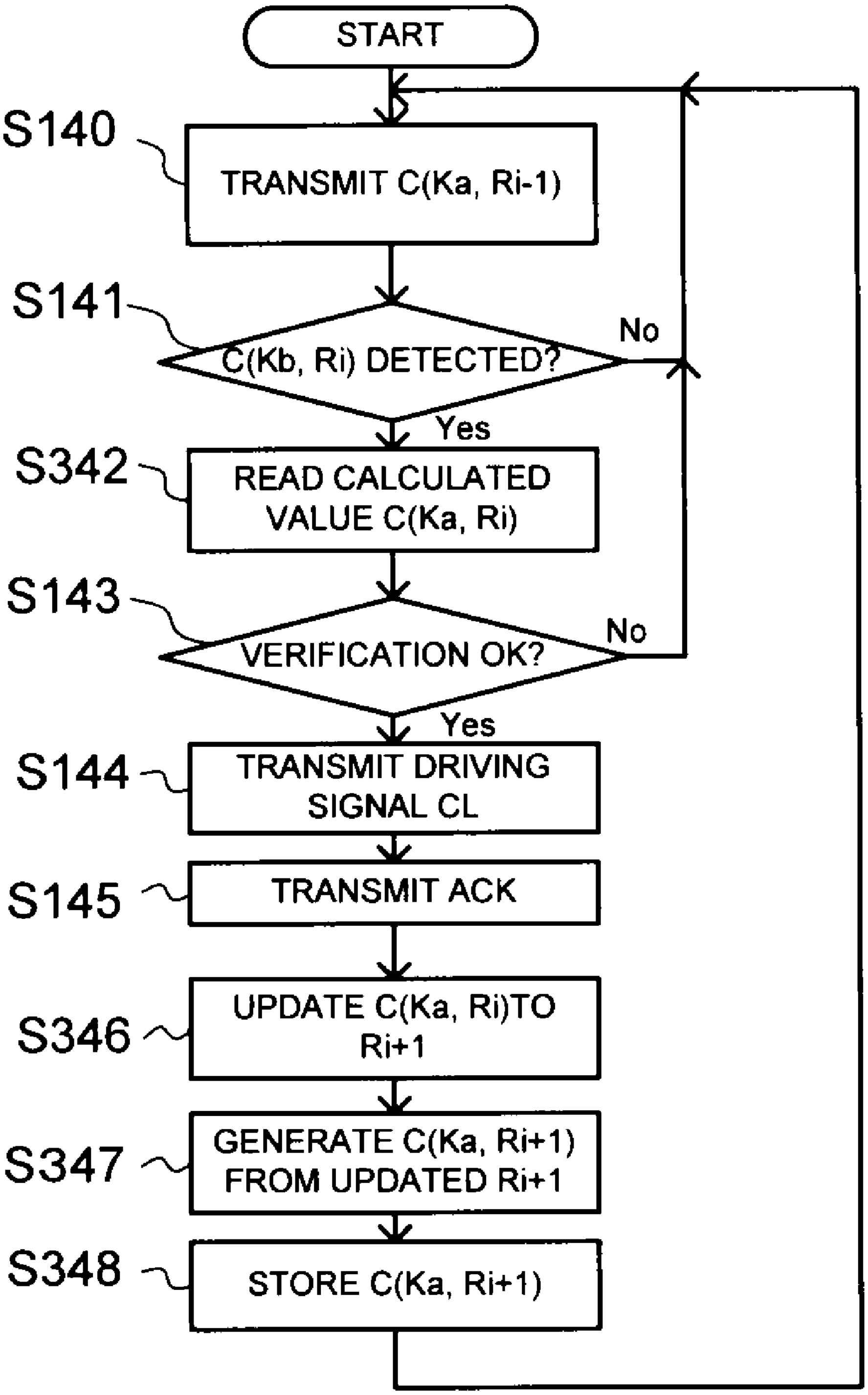
FIG. 10 is a flow chart showing an operation of a lock driving device according to the third embodiment.

Subsequently, a control system according to a third embodiment of the present invention will be described in detail with reference to FIG. 8 to FIG. 10. In an explanation hereinbelow, configurations and operations common to the first and second embodiments are given the same reference numerals, and an duplicate explanation thereof will be omitted. As shown in FIG. 8, the control system of this embodiment corresponds to the control system 2 shown in FIG. 6 in which the configuration of the lock driving device 21 is changed and the respective operations of the control device and the lock driving device are changed. Concretely, a lock driving device 23 according to this embodiment has the configuration of the lock driving device 21 according to the first embodiment shown in FIG. 3 to which a calculated value memory 327 storing the calculation result of the calculation unit 125 is further added.

A calculation unit 325 and a key memory 326 are common to the calculation unit 125 and the key memory 126 according to the first embodiment. The calculated value memory 327 is a nonvolatile memory storing a calculated value C being a calculation result of the calculation unit 325. In the control system of this embodiment, the lock driving device 23 also stores a calculated value C(Ka, $R_{i+1}$) with which the next response signal is compared, in addition to trigger information $R_{i+1}$ included in the next trigger signal. Specifically, the lock driving device 23 receiving the response signal does not generate the calculated value C at every time of the reception, but, it uses the calculated value C stored in the previous sequence for verifying the response signal. Accordingly, a speed-up of the operation is realized by reducing a time lag from the reception of response signal to the generation of driving signal CL.

Hereinafter, an operation of a control device 13 of this embodiment will be explained with reference to FIG. 8 and FIG. 9. The detection unit 110 is constantly provided with power, and it is in a state of awaiting radio waves from the lock driving device 23 (S130). When a user carrying the control device 13 approaches the lock driving device 23 and enters an effective coverage area of the radio waves from the lock driving device 23 (Yes in S130), the detection unit 110 activates the determination unit 111 by starting the supply of power thereto (S131).

When activated, the determination unit 111 compares trigger information included in a trigger signal received by the detection unit 110 with trigger information $R_i$ (=C (Kb, $R_{i-1}$)) in the trigger memory 112, to thereby determine whether the trigger signal is from the correct lock driving device 23 (S332). If the trigger signal is not the correct one as a result of determination, the determination unit 111 stops its operation (No in S132). If the trigger signal is the correct trigger signal $R_i$ (=C (Ka, $R_{i-1}$): previous response signal) as a result of determination (Yes in S332), the determination unit 111 starts the supply of power to the other functional elements such as the calculation unit 113, the transmission unit 115 and the trigger updating unit 116 (S133). In addition, the determination unit 111 instructs the transmission unit 115 to transmit the response signal, and the transmission unit 115 reads the calculated value C (Kb, $R_i$) from the calculated value memory 317 to transmit it via the antenna ANT1 (S235).

After the calculated value C is transmitted, the determination unit 111 stands ready to receive the ACK signal from the lock driving device (S136). After receiving the ACK signal, the determination unit 111 instructs the trigger updating unit 316 to update the trigger information, and also instructs the calculation unit 113 to calculate a new calculated value C for the next sequence. The trigger updating unit 316 reads the calculated value C (Kb, $R_i$) being the response signal stored in the calculated value memory 317, and stores the value in the trigger memory 112 as new trigger information $R_{i+1}$ (S337). Further, the calculation unit 113 reads the updated trigger information $R_{i+1}$ from the trigger memory 112, generates the new calculated value C (Kb, $R_{i+1}$) by encrypting the trigger information using the key Kb stored in the key memory 114 (S238), and writes the generated calculated value C (Kb, $R_{i+1}$) to the calculated value memory 317 (S239).

In the next operation and thereafter, the determination unit 111 reads the trigger information $R_{i+1}$ updated by the trigger updating unit 316 from the trigger memory 112, and determines whether or not the information is correct by comparing the information with the trigger information $R_{i+1}$ of the trigger signal sent from the lock driving device 23 (S130, S131, S332). If the trigger signal is the correct one, the transmission unit 115 reads the calculated value C (Kb, $R_{i+1}$) newly generated by the calculation unit 113 from the calculated value memory 317, and transmits it as the response signal.

According to the control device of this embodiment, since the trigger information used for the determination of the trigger signal in the previous sequence is updated by each sequence, even if the trigger signal is intercepted, it is possible to reduce the chance of the unauthorized control of the device. Further, in the control device of this embodiment, since there is no need to perform calculation processing during a period of time from the determination of trigger signal to the transmission of response signal, it is possible to speed up the operation.

Next, an operation of the lock driving device 23 of this embodiment will be described with reference to FIG. 8 and FIG. 10. The transmission control unit 120 reads the trigger information C(Ka, $R_{i-1}$) from the trigger memory 121, generates a periodical trigger signal, and sends it to the transmission unit 122. The transmission unit 122 repeatedly transmits the sent trigger signal via the antenna ANT2 (S140).

In order to detect radio waves from the control device 13, the detection unit 123 is always in a standby state (S141). When detecting the radio waves from the control device 13 (Yes in S141), the detection unit 123 activates the determination unit 124 by supplying power thereto, and sends the demodulated received signal (received information) to the determination unit 124. The determination unit 124 activates by receiving the supply of power, reads the calculated value C (Ka, $R_i$) stored in the calculated value memory 327 (S342), and compares the value with the received information received from the detection unit 123 (S143). Namely, the determination unit 124 compares the received trigger information C (Kb, $R_i$) with the calculated value C (Ka, $R_i$) read from the calculated value memory 327.

If they match as a result of comparison (Yes in S143), the determination unit 124 generates the driving signal CL and sends it to the electrically driven lock 31 (S144).

After transmitting the driving signal CL, the determination unit 124 instructs the transmission control unit 120 to transmit the ACK, and the transmission control unit 120 transmits the ACK through the transmission unit 122 (S145). In addition, the transmission control unit 120 stops the transmission of trigger information for a certain period of time.

After transmitting the ACK, the transmission control unit 120 instructs the trigger updating unit 127 to update the trigger information $R_{i+1}$=C (Ka, $R_i$), and the trigger updating unit 127 writes the calculated value C (Ka, $R_i$) from the calculated value memory 327 used for the comparison in step 143 to the trigger memory 121 as the trigger information to be used for the next time (S346). Accordingly, the trigger information in the trigger memory 121 is updated.

Subsequently, the transmission control unit 120 instructs the calculation unit 325 to generate a calculated value C (Ka, $R_{i+1}$) to be used for the determination regarding the correctness of the next response signal. The calculation unit 325 reads the updated trigger information from the trigger memory 121, generates the new calculated value C (Ka, $R_{i+1}$) using the key Ka stored in the key memory 326 (S347), and stores the value in the calculated value memory 327 (S348).

In the next operation, the transmission control unit 120 generates and transmits the trigger signal by reading the calculated value C (Ka, $R_i$) at this time from the trigger memory 121, and the determination unit 124 determines whether the received information is from the correct control device by using the calculated value C (Ka, $R_{i+1}$) newly generated at this time.

According to the control system of this embodiment, since the previous calculated value C is used as the trigger information to be transmitted by the lock driving device, it is possible to further enhance the security. Further, according to the control system of this embodiment, since the calculated value C to be used for the determination of response signal in the next sequence is previously generated and stored, it is possible to speed up the operation from the reception of response signal to the generation of driving signal.

Figure 12:
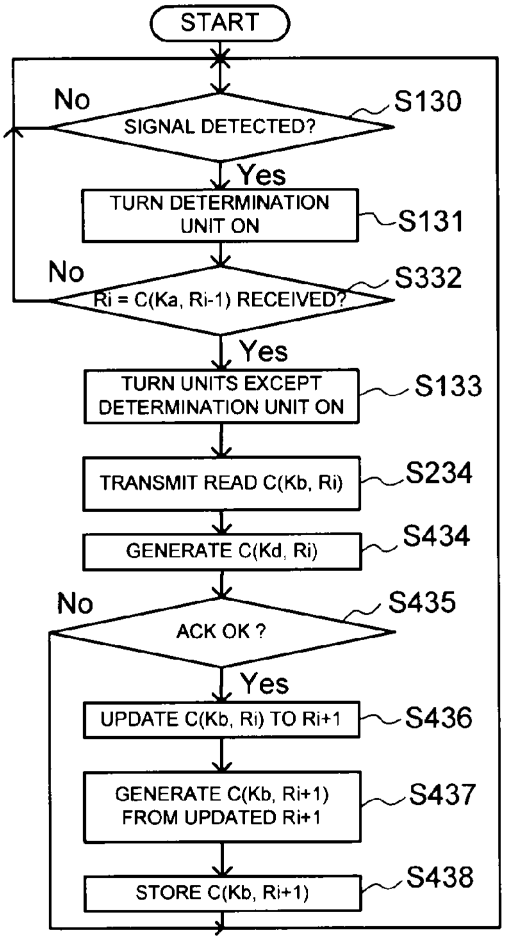
FIG. 12 is a flow chart showing an operation of a control device according to the fourth embodiment.
Figure 13:
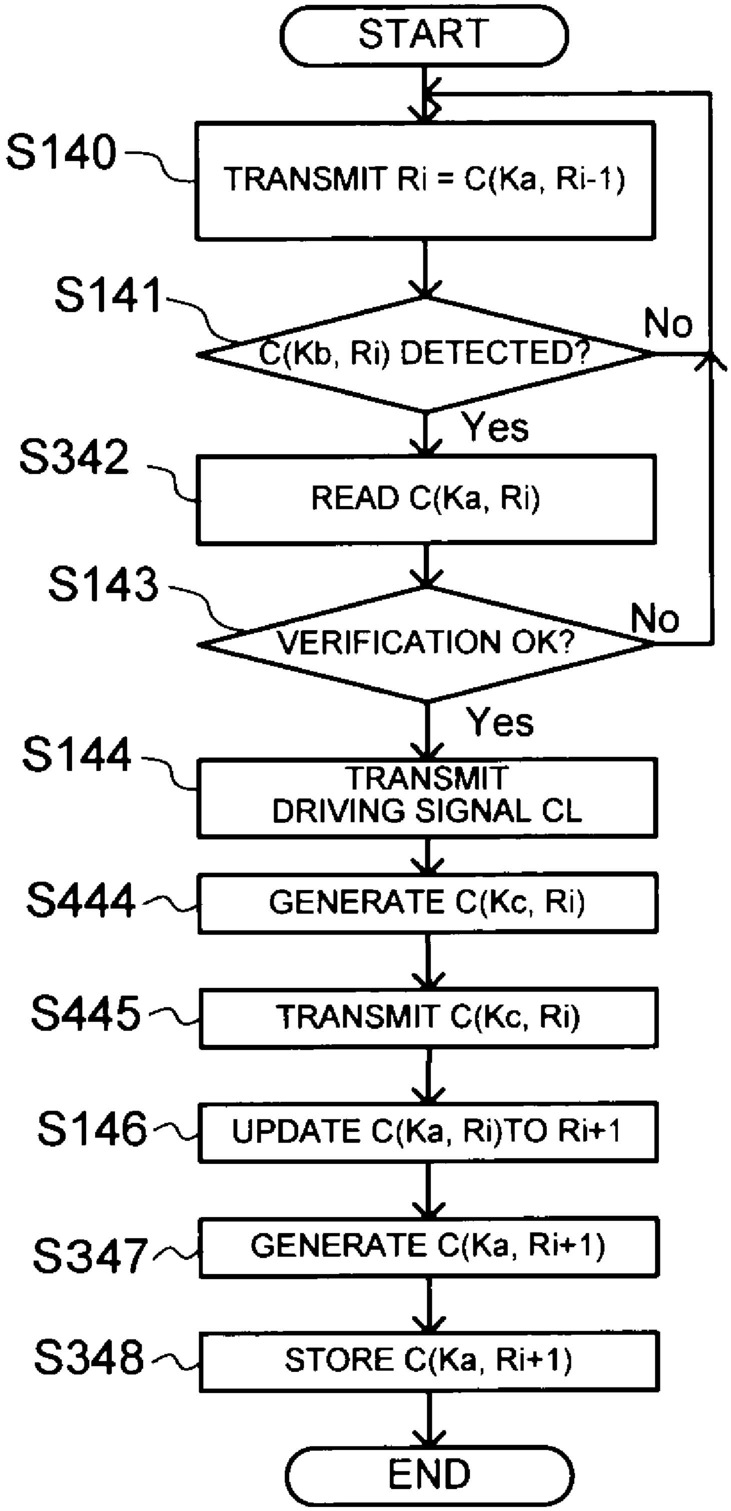
FIG. 13 is a flowchart showing an operation of a lock driving device according to the fourth embodiment.

Subsequently, a control system according to a fourth embodiment of the present invention will be described in detail with reference to FIG. 11 to FIG. 13. In an explanation hereinbelow, configurations and operations common to the first to third embodiments are given the same reference numerals, and an duplicate explanation thereof will be omitted.

Figure 11:
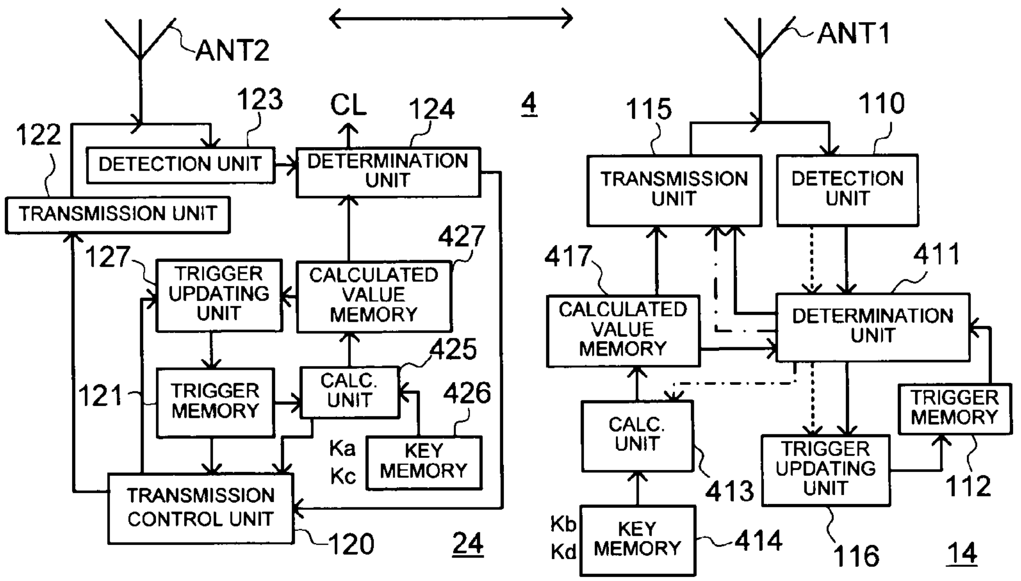
FIG. 11 is a block diagram showing a configuration of a control system according to a fourth embodiment of the present invention.

As shown in FIG. 11, the control system of this embodiment corresponds to the control system 3 shown in FIG. 8 in which the configuration of the lock driving device 23 is changed. In the control system of this embodiment, the lock driving device transmits a specially encrypted ACK signal after successfully conducting the authentication of control device, and the control device updates the trigger information and the calculated value according to the correctness of the ACK signal.

A determination unit 411 also has a function of determining the correctness of the ACK signal sent from a lock driving device 24, in addition to the function of determination unit 111 according to the first to third embodiments. A calculation unit 413 has a function of further encrypting the trigger information stored in the trigger memory 112, in addition to the function of calculation unit 113 according to the first to third embodiments. A key memory 414 also stores a key Kd used when the calculation unit 413 encrypts the trigger information for verifying the ACK sent from the lock driving device, in addition to the key Kb for generating the response signal.

Hereinafter, an operation of a control device 14 of this embodiment will be explained with reference to FIG. 11 and FIG. 12. The detection unit 110 is constantly provided with power, and it is in a state of awaiting radio waves from the lock driving device 24 (S130). When a user carrying the control device 14 approaches the lock driving device 24 and enters an effective coverage area of the radio waves from the lock driving device 24 (Yes in S130), the detection unit 110 activates the determination unit 411 by starting the supply of power thereto (S131).

When activated, the determination unit 411 compares trigger information included in a trigger signal received by the detection unit 110 with trigger information $R_i$ (=C(Kb, $R_{i-1}$)) in the trigger memory 112, to thereby determine whether the trigger signal is from the correct lock driving device 24 (S332). If the trigger signal is not the correct one as a result of determination, the determination unit 411 stops its operation (No in S132). If the trigger signal is the correct trigger signal $R_i$ (=C (Ka, $R_{i-1}$): previous response signal) as a result of determination (Yes in S332), the determination unit 411 starts the supply of power to the other functional elements such as the calculation unit 413, the transmission unit 115 and the trigger updating unit 116 (S133). In addition, the determination unit 411 instructs the transmission unit 115 to transmit the response signal, and the transmission unit 115 reads a calculated value C(Kb, $R_i$) from the calculated value memory 417 to transmit it via the antenna ANT1 (S234).

After transmitting the calculated value C, the determination unit 411 instructs the calculation unit 413 to encrypt the trigger information $R_i$ stored in the trigger memory 112, and waits for the reception of ACK signal from the lock driving device 24. The calculation unit 413 reads the trigger information $R_i$ from the trigger memory 112, encrypts the information using the key Kd stored in the key memory 414, and stores it in the calculated value memory 417 (S434). Upon receiving the ACK signal from the lock driving device 24 via the detection unit 110, the determination unit 411 reads the encrypted trigger information C (Kd, $R_i$) from the calculated value memory 417, and compares it with information on the received ACK signal (=C (Kc, $R_i$)) (S435).

If the both are the same as a result of comparison (Yes in S435), the determination unit 411 instructs the trigger updating unit 116 to update the trigger information. The trigger updating unit 116 stores the calculated value C (Kb, $R_i$) (the calculated value transmitted as the response signal) stored in the calculated value memory 417 in the trigger memory 112, to thereby update the trigger information (S436).

Subsequently, the calculation unit 413 reads the updated trigger information from the trigger memory 112, generates a calculated value C (Kb, $R_{i+1}$) for determining the next trigger signal (S437), and stores the value in the calculated value memory 417 (S438).

In the next operation and thereafter, the determination unit 411 reads the trigger information $R_{i+1}$=C (Kb, $R_i$) updated by the trigger updating unit 116 from the trigger memory 112, and determines whether or not the information is correct by comparing the information with the trigger information of the trigger signal sent from the lock driving device 24 (S130, S131, S332). If the trigger signal is the correct one, the transmission unit 115 reads the calculated value C (Ka, $R_{i+1}$) newly generated and stored in the calculated value memory 417 from the calculated value memory 417, and transmits it as the response signal.

According to the control system of this embodiment, the trigger information and the calculated value C to be used in the next sequence are updated after the ACK signal from the lock driving device is authenticated, so that the secure update processing can be realized.

Subsequently, the lock driving device 24 of this embodiment will be described. A calculation unit 425 has a function of further encrypting the trigger information stored in the trigger memory 121, in addition to the function of calculation unit 125 according to the first to third embodiments. A key memory 426 also stores a key Kc used when the calculation unit 425 encrypts the trigger information as the ACK signal, in addition to the key Ka for verifying the response signal.

Hereinafter, an operation of the lock driving device 24 of this embodiment will be described with reference to FIG. 11 and FIG. 13. The transmission control unit 120 reads the trigger information $R_i$=C (Ka, $R_{i-1}$) from the trigger memory 121, generates a periodical trigger signal, and sends it to the transmission unit 122. The transmission unit 122 repeatedly transmits the sent trigger signal via the antenna ANT2 (S140).

In order to detect radio waves from the control device 14, the detection unit 123 is always in a standby state (S141). Upon detecting the radio waves from the control device 14 (Yes in S141), the detection unit 123 activates the determination unit 124 by supplying power thereto, and sends the demodulated received signal (received information) to the determination unit 124. The determination unit 124 activates by receiving the supply of power, reads a calculated value C (Ka, $R_i$) stored in a calculated value memory 427 (S342), and compares the value with the received information received from the detection unit 123 (S143).

If they match as a result of comparison (Yes in S143), the determination unit 124 generates the driving signal CL and sends it to the electrically driven lock 31 (S144).

After transmitting the driving signal CL, the determination unit 124 instructs the calculation unit 425 to encrypt the trigger information $R_i$=C (Ka, $R_{i-1}$) stored in the trigger memory 121, and also instructs the transmission control unit 120 to transmit the ACK. Upon receiving the instruction, the calculation unit 425 reads the trigger information from the trigger memory 121, and generates a calculated value C (Kc, $R_i$) by encrypting the trigger information using the key Kc for encrypting the ACK stored in the key memory 426 (S444). The transmission control unit 120 transmits the calculated value C generated by the calculation unit 425 as the ACK through the transmission unit 122 (S445). In addition, the transmission control unit 120 stops the transmission of trigger information for a certain period of time.

After transmitting the ACK, the transmission control unit 120 instructs the trigger updating unit 127 to update the trigger information, and the trigger updating unit 127 writes the calculated value C (Ka, $R_i$) from the calculated value memory 427 used for the comparison in step 143 to the trigger memory 121 as the trigger information $R_{i+1}$ to be used for the next time (S146). Accordingly, the trigger information in the trigger memory 121 is updated.

Subsequently, the transmission control unit 120 instructs the calculation unit 425 to generate a calculated value C to be used for the determination regarding the correctness of the next response signal. The calculation unit 425 reads the updated trigger information from the trigger memory 121, generates the new calculated value C (Ka, $R_{i+1}$) using the key K a stored in the key memory 426 (S347), and stores the value in the calculated value memory 427 (S348).

In the next operation, the transmission control unit 120 generates and transmits the trigger signal by using the calculated value C (Ka, $R_i$) at this time from the trigger memory 121, and the determination unit 124 determines whether the received information is from the correct control device by using the calculated value C (Ka, $R_{i+1}$) newly generated at this time.

According to the control system of this embodiment, since the previous calculated value C is used as the trigger information to be transmitted by the lock driving device, it is possible to further enhance the security. Further, according to the control system of this embodiment, since the calculated value C to be used for the determination of the response signal in the next sequence is previously generated and stored, it is possible to speed up the operation from the reception of response signal to the generation of driving signal.

Figure 15:
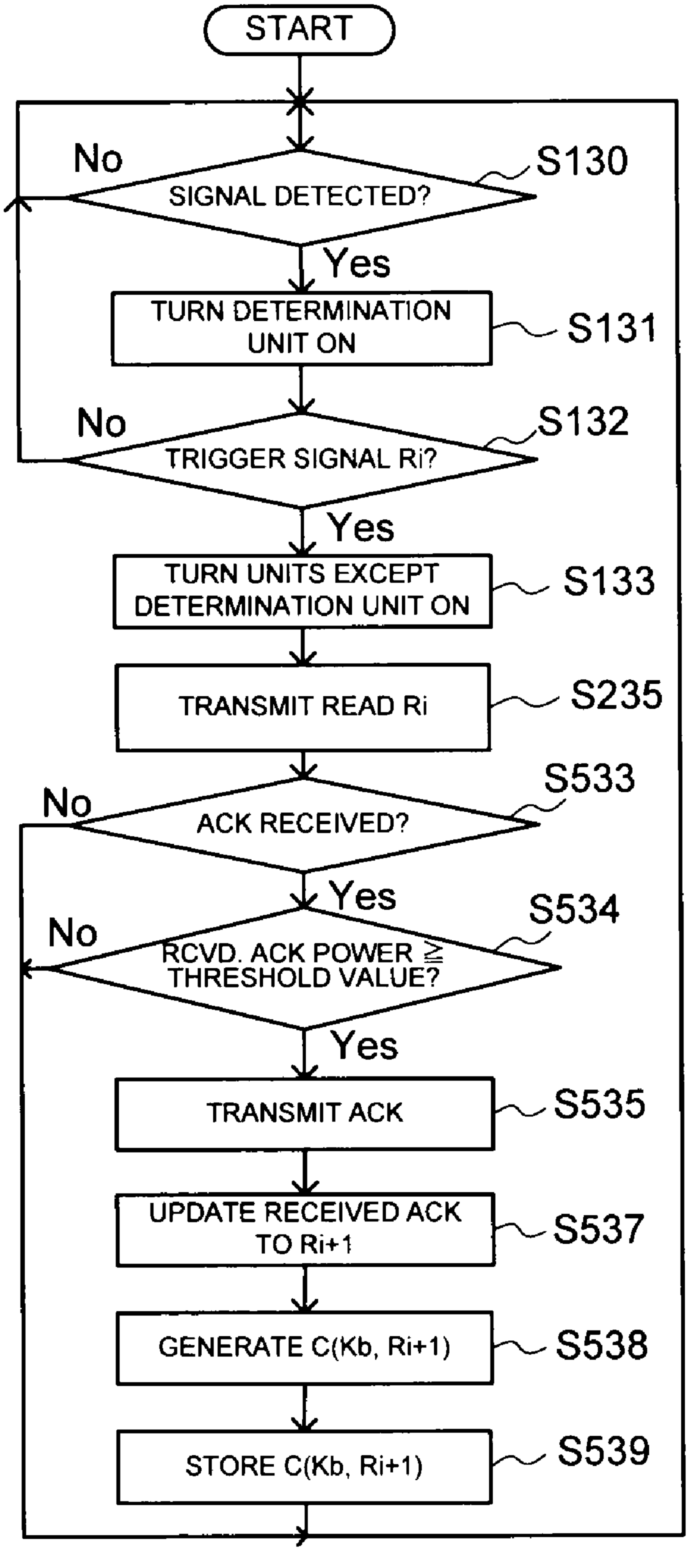
FIG. 15 is a flow chart showing an operation of a control device according to the fifth embodiment.
Figure 16:
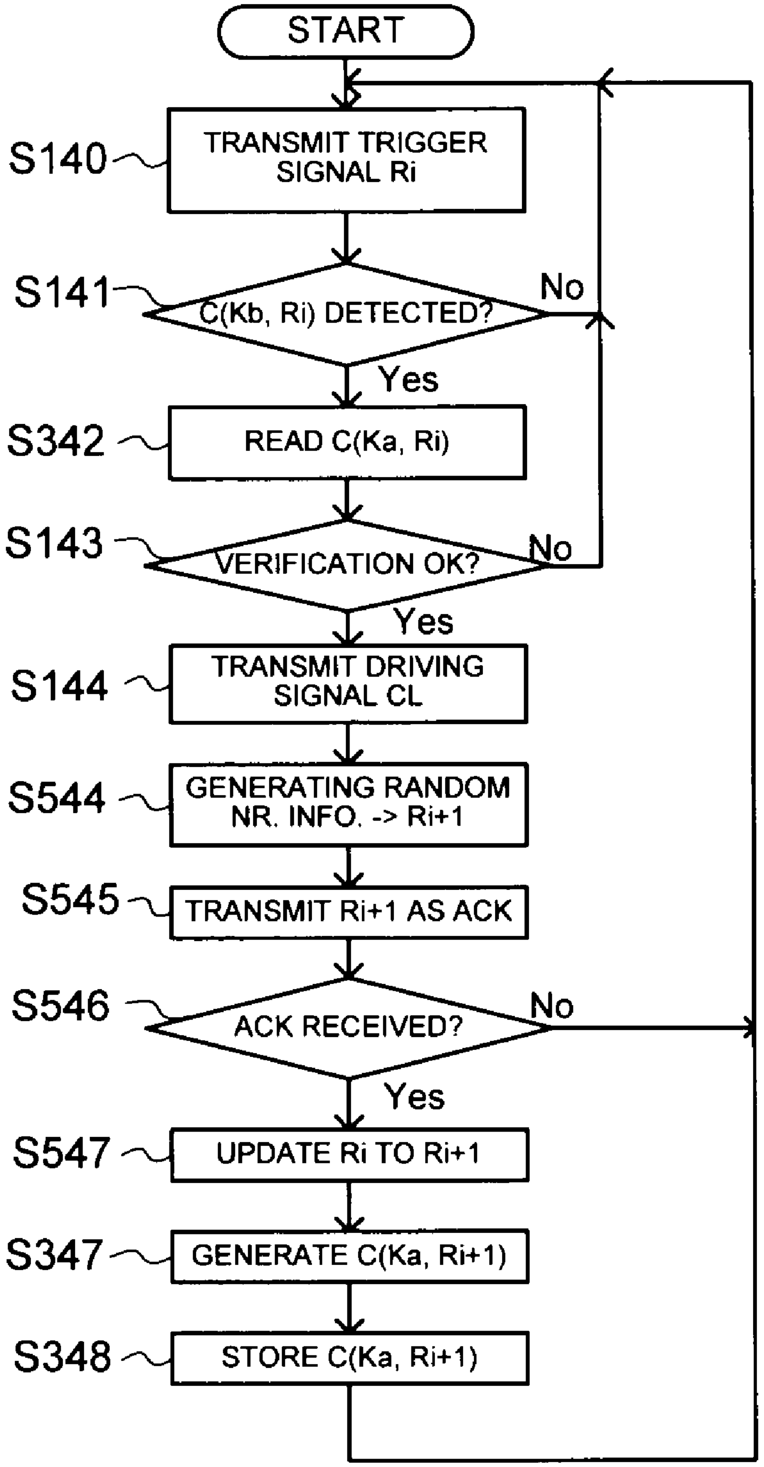
FIG. 16 is a flowchart showing an operation of a lock driving device according to the fifth embodiment.

Subsequently, a control system according to a fifth embodiment of the present invention will be described in detail with reference to FIG. 14 to FIG. 16. In an explanation hereinbelow, configurations and operations common to the first to fourth embodiments are given the same reference numerals, and an duplicate explanation thereof will be omitted.

Figure 14:
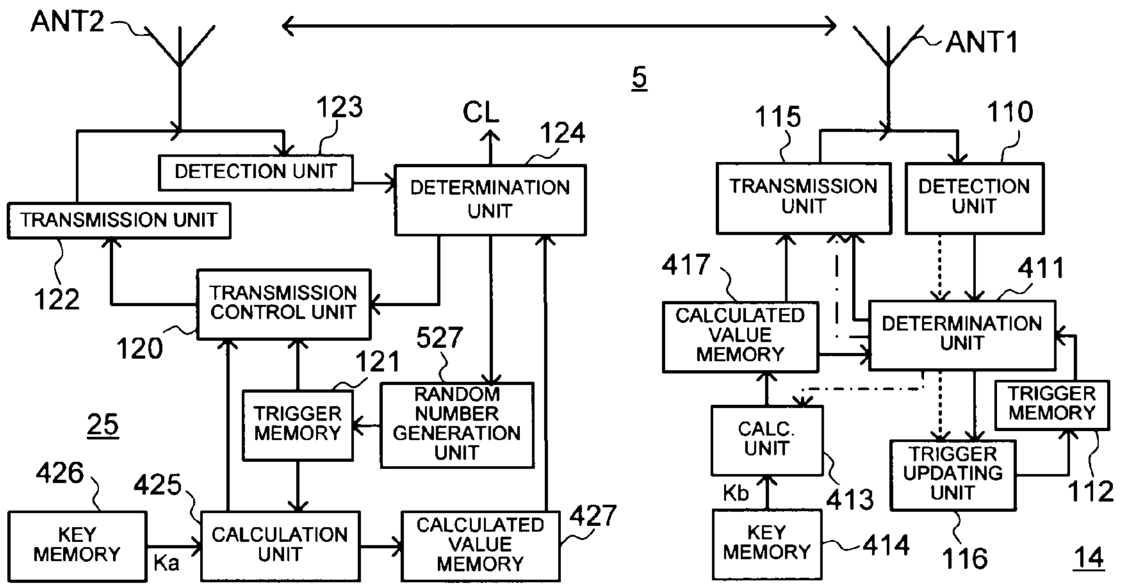
FIG. 14 is a block diagram showing a configuration of a control system according to a fifth embodiment of the present invention.

As shown in FIG. 14, the control system of this embodiment corresponds to the control system 4 shown in FIG. 11 in which the configuration of the lock driving device 24 is changed. Concretely, a lock driving device 25 according to this embodiment is a device in which the trigger updating unit 127 according to the fourth embodiment shown in FIG. 11 is replaced with a random number generation unit 527. In the control system of this embodiment, the trigger signal to be transmitted toward the control device from the lock driving device is generated based on random number information generated by the random number generation unit 527.

Hereinafter, an operation of a control device 14 of this embodiment will be explained with reference to FIG. 14 and FIG. 15. The detection unit 110 is constantly provided with power, and it is in a state of awaiting radio waves from the lock driving device 25 (S130). When a user carrying the control device 14 approaches the lock driving device 25 and enters an effective coverage area of the radio waves from the lock driving device 25 (Yes in S130), the detection unit 110 activates the determination unit 411 by starting the supply of power thereto (S131).

When activated, the determination unit 411 compares trigger information included in a trigger signal received by the detection unit 110 with trigger information $R_i$ in the trigger memory 112, to thereby determine whether the trigger signal is from the correct lock driving device 25 (S132). If the trigger signal is not the correct one as a result of determination, the determination unit 411 stops its operation (No in S132). If the trigger signal is the correct one as a result of determination (Yes in S132), the determination unit 411 starts the supply of power to the other functional elements such as the calculation unit 413, the transmission unit 115 and the trigger updating unit 116 (S133). In addition, the determination unit 411 instructs the transmission unit 115 to transmit a response signal, and the transmission unit 115 reads a calculated value C (Kb, $R_i$) from the calculated value memory 417 to transmit it via the antenna ANT1 (S235).

After the calculated value C is transmitted, the determination unit 411 puts itself in a standby state for receiving the ACK signal (S533). When the ACK signal is received within a predetermined period of time (Yes in S533) and the received signal power equals to or larger than a predetermined threshold value (Yes in S534), the determination unit 411 determines that the ACK signal is the correct one, and instructs the transmission unit 115 to transmit the ACK signal to the lock driving device 25, and the transmission unit 115 transmits the ACK signal (S535).

When the ACK signal is transmitted, the determination unit 411 instructs the trigger updating unit 116 to update the trigger information stored in the trigger memory 112 using the received ACK signal, and the trigger updating unit 116 updates the trigger information by writing the ACK signal received from the determination unit 411 to the trigger memory 112 (S537).

Subsequently, the determination unit 411 instructs the calculation unit 413 to calculate a calculated value C to be the next response signal, and the calculation unit 413 encrypts the updated trigger information $R_{i+1}$ read from the trigger memory 112 using the key Kb stored in the key memory 414 (S538), and stores the information in the calculated value memory 417 (S539). As a result, the calculated value C (Kb, $R_{i+1}$) is stored in the calculated value memory 417.

In the next operation and thereafter, the transmission unit 115 reads the calculated value C (Kb, $R_{i+1}$) newly generated and stored in the calculated value memory 417 from the calculated value memory 417, and transmits it as the response signal.

According to the control device of this embodiment, since the determination regarding the correctness of the ACK signal sent from the lock driving device is simplified, it is possible to speed up the operation of the control device.

Next, the lock driving device 25 of this embodiment will be described. The random number generation unit 527 has a function of generating the random number information based on an instruction from the determination unit 124 and storing the information in the trigger memory 121 as the trigger information $R_i$.

Hereinafter, an operation of the lock driving device 25 of this embodiment will be described with reference to FIG. 14 and FIG. 16. The transmission control unit 120 reads the trigger information $R_i$ from the trigger memory 121, generates a periodical trigger signal, and sends it to the transmission unit 122. The transmission unit 122 repeatedly transmits the sent trigger signal via the antenna ANT2 (S140).

In order to detect radio waves from the control device 14, the detection unit 123 is always in a standby state (S141). Upon detecting the radio waves from the control device 14 (Yes in S141), the detection unit 123 activates the determination unit 124 by supplying power thereto, and sends the received information (here, C (Kb, $R_i$)) on the demodulated received signal to the determination unit 124. The determination unit 124 activates by receiving the supply of power, reads a calculated value C (Ka, $R_i$) stored in the calculated value memory 427 (S342), and compares the value with the received information received from the detection unit 123 (S143).

If they match as a result of comparison (Yes in S143), the determination unit 124 generates the driving signal CL and sends it to the electrically driven lock 31 (S144).

After transmitting the driving signal CL, the determination unit 124 instructs the random number generation unit 527 to generate the random number information, and the random number generation unit 527 generates the random number information, and stores the information in the trigger memory 121 as new trigger information (S544). When the trigger information is newly generated, the transmission control unit 120 reads the trigger information from the trigger memory 121 and sends it to the transmission unit 122 as the ACK signal, and the transmission unit 122 transmits the received ACK signal (S545). The newly generated trigger information $R_{i+1}$ is used as trigger information in the next sequence, and is also used as the ACK signal to the control device.

After the ACK signal is transmitted, the determination unit 124 waits for the reception of ACK signal from the control device (S546). After the ACK signal is received (Yes in S546), the transmission control unit 120 instructs the calculation unit 425 to generate a calculated value C (Ka, $R_{i+1}$) to be used for the determination regarding the correctness of the next response signal. The calculation unit 425 reads the updated trigger information $R_{i+1}$ from the trigger memory 121, generates the new calculated value C (Ka, $R_{i+1}$) using the key Ka stored in the key memory 426 (S347), and stores the value in the calculated value memory 427 (S348).

In the next operation, the transmission control unit 120 generates and transmits the trigger signal by using the random number information (=$R_{i+1}$) generated at this time from the trigger memory 121, and the determination unit 124 determines whether the received information is from the correct control device by using the calculated value C (Ka, $R_{i+1}$) newly generated at this time.

According to the control system of this embodiment, since the random number information generated by each sequence is used as the trigger information to be transmitted by the lock driving device, it is possible to further enhance the security. Further, according to the control system of this embodiment, since the calculated value C to be used for the determination of the response signal in the next sequence is previously generated and stored, it is possible to speed up the operation from the reception of response signal to the generation of driving signal.

Figure 18:
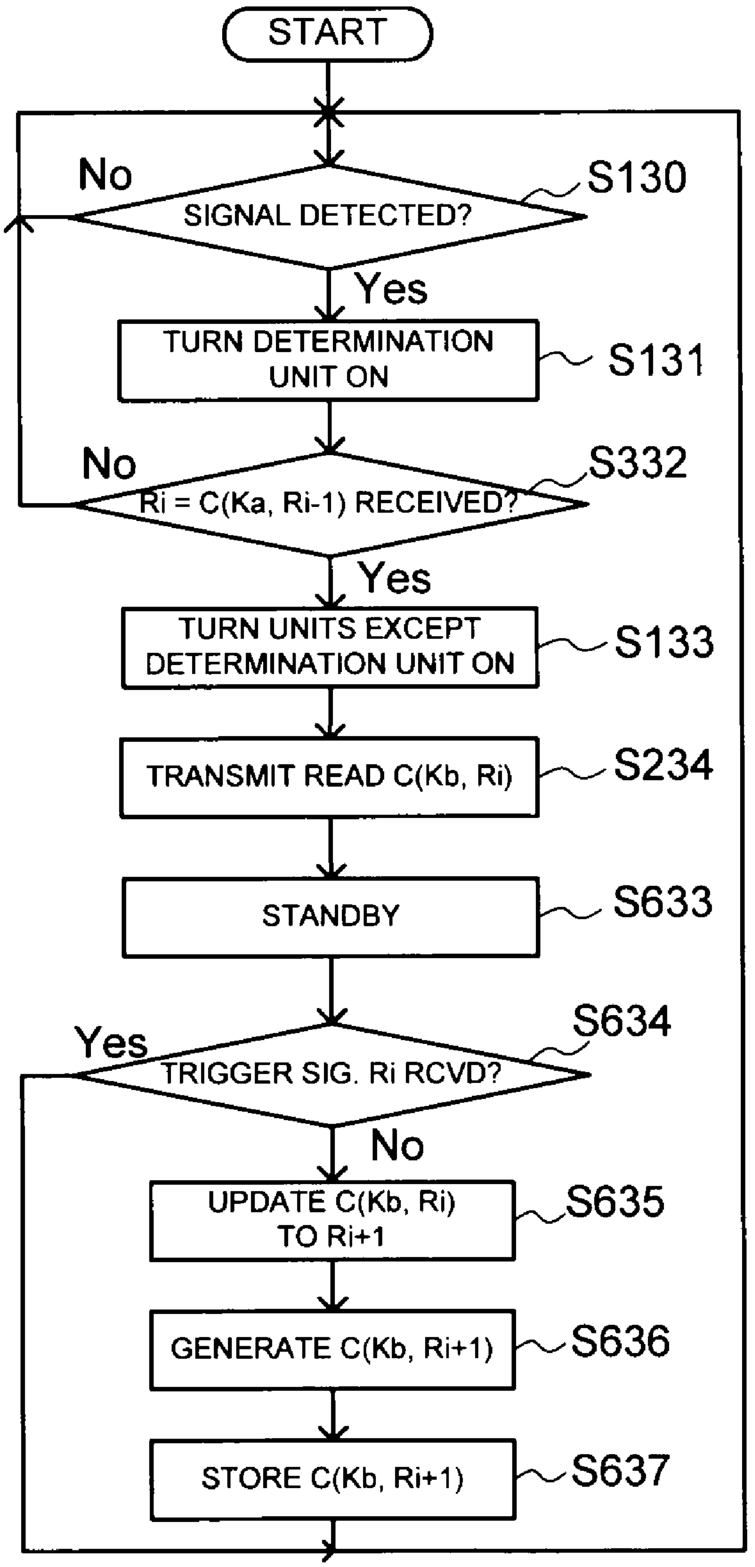
FIG. 18 is a flow chart showing an operation of a control device according to the sixth embodiment.
Figure 19:
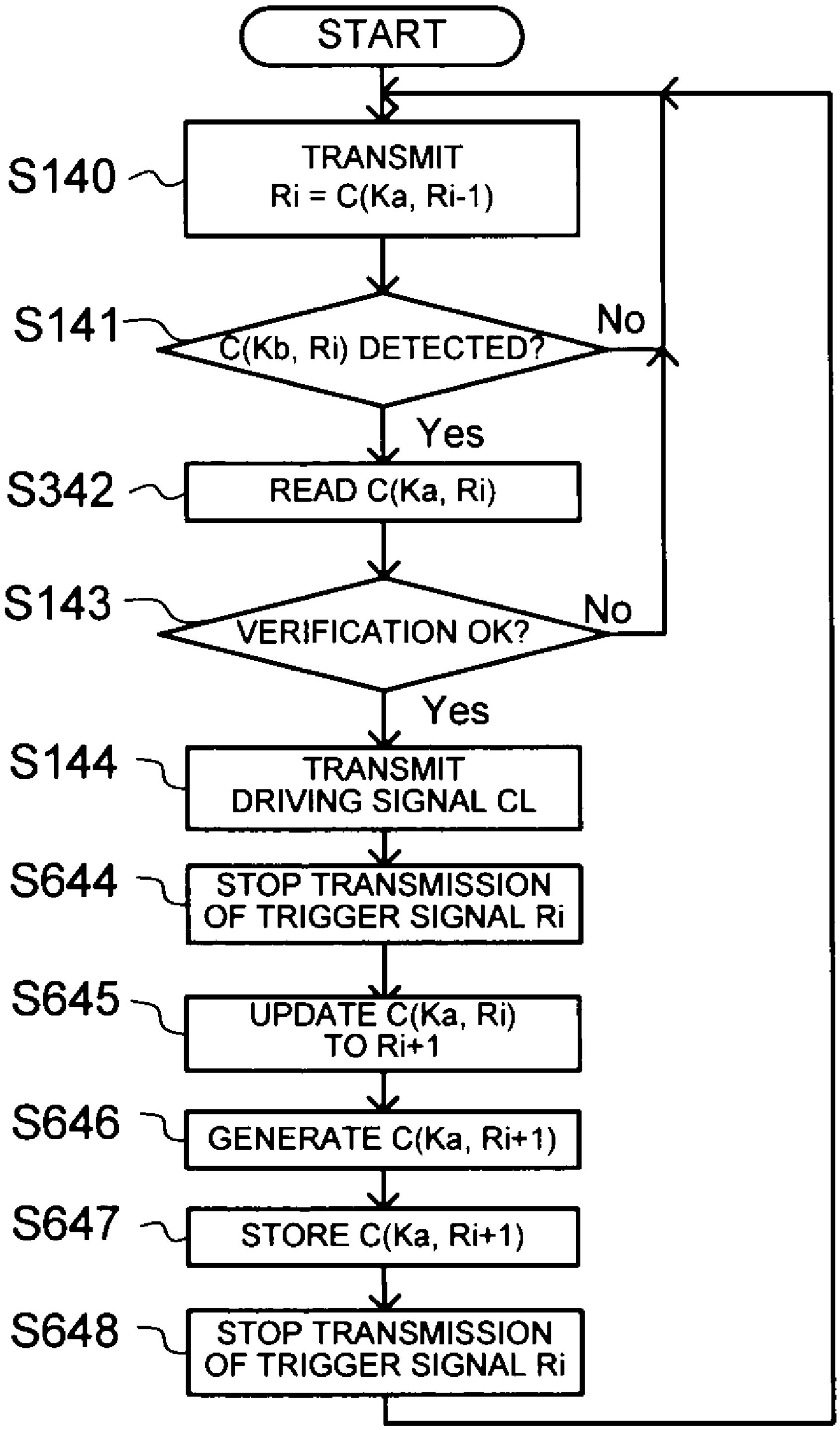
FIG. 19 is a flowchart showing an operation of a lock driving device according to the sixth embodiment.

Subsequently, a control system according to a sixth embodiment of the present invention will be described in detail with reference to FIG. 17 to FIG. 19. In an explanation hereinbelow, configurations and operations common to the first to fifth embodiments are given the same reference numerals, and an duplicate explanation thereof will be omitted.

Figure 17:
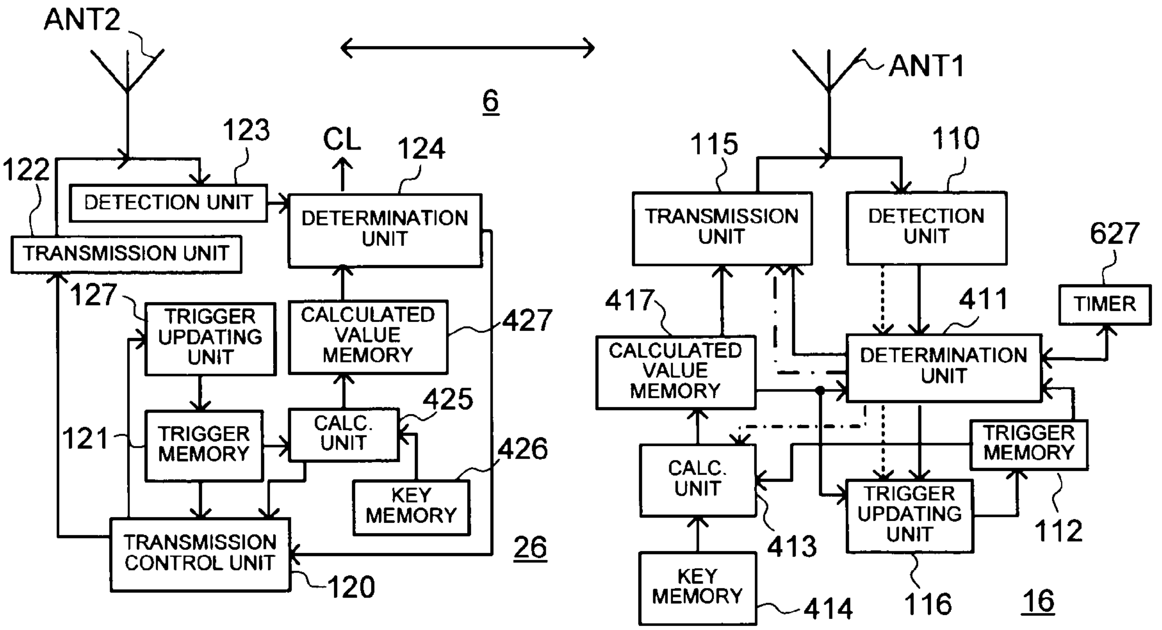
FIG. 17 is a block diagram showing a configuration of a control system according to a sixth embodiment of the present invention.

As shown in FIG. 17, the control system of this embodiment corresponds to the control system 4 shown in FIG. 11 in which a timer 627 is further provided to the configuration of the control device 14. In the control system of this embodiment, the transmission/reception of ACK signal between the lock driving device and the control device is not conducted, and the control device starts generating a calculated value and the like when the trigger signal to be transmitted from the lock driving device is stopped for a certain period of time.

The timer 627 is connected to the determination unit 411, and has a function of measuring time from when the determination unit 411 does not receive the trigger signal from the lock driving device and giving, after a predetermined period of time elapses, a timing signal at the time of updating the trigger information, generating a new calculated value C, and the like.

Hereinafter, an operation of a control device 16 of this embodiment will be explained with reference to FIG. 17 and FIG. 18. The detection unit 110 is constantly provided with power, and it is in a state of awaiting radio waves from a lock driving device 26 (S130). When a user carrying the control device 16 approaches the lock driving device 26 and enters an effective coverage area of the radio waves from the lock driving device 26 (Yes in S130), the detection unit 110 activates the determination unit 411 by starting the supply of power thereto (S131).

When activated, the determination unit 411 compares trigger information included in a trigger signal received by the detection unit 110 with trigger information $R_i$ (=C (Kb, $R_{i-1}$)) in the trigger memory 112, to thereby determine whether the trigger signal is from the correct lock driving device 26 (S332). If the trigger signal is not the correct one as a result of determination, the determination unit 411 stops its operation (No in S332). If the trigger signal is the correct trigger signal $R_i$ (=C (Ka, $R_{i-1}$): the same signal as the previous response signal) as a result of determination (Yes in S332), the determination unit 411 starts the supply of power to the other functional elements such as the calculation unit 413, the transmission unit 115 and the trigger updating unit 116 (S133). In addition, the determination unit 411 instructs the transmission unit 115 to transmit a response signal, and the transmission unit 115 reads a calculated value C(Kb, $R_i$) from the calculated value memory 417 to transmit it via the antenna ANT1 (S234). In addition, the determination unit 411 sends a start signal to the timer 627.

After the calculated value C (Kb, $R_i$) is transmitted, the determination unit 411 stands ready to check presence/absence of the reception of the trigger signal (S633). The timer 627 starts measuring time after receiving the start signal from the determination unit 411, and gives a processing signal to the determination unit 411 at a predetermined timing. If the determination unit 411 does not receive the succeeding trigger signals at the time of receiving the processing signal from the timer 627 (No in S634), it instructs the trigger updating unit 116 to update the trigger information. The trigger updating unit 116 stores the calculated value C (Kb, $R_i$) stored in the calculated value memory 417 (calculated value transmitted as the response signal) in the trigger memory 112, to thereby update the trigger information (S635). As a result, trigger information $R_{i+1}$ to be stored in the trigger memory 112 becomes C (Kb, $R_i$).

Subsequently, the calculation unit 413 reads the updated trigger information $R_{i+1}$ from the trigger memory 112, generates a calculated value C (Kb, $R_{i+1}$) for determining the next trigger signal (S636), and stores the value in the calculated value memory 417 (S637).

In the next operation and thereafter, the determination unit 411 reads the trigger information $R_{i+1}$ updated at this time from the trigger memory 112, and determines whether or not the information is correct by comparing the information with the trigger information of the trigger signal sent from the lock driving device 26 (S130, S131, S332). If the trigger signal is the correct one, the transmission unit 115 reads the calculated value C (Kb, $R_{i+1}$) newly generated and stored in the calculated value memory 417 from the calculated value memory 417, and transmits it as the response signal.

According to the control device of this embodiment, since the update of the trigger information and the like is automatically performed regardless of the transmission/reception of the ACK signal, it is possible to simplify the circuit configuration.

Next, an operation of the lock driving device 26 of this embodiment will be described with reference to FIG. 17 and FIG. 19. The transmission control unit 120 reads trigger information $R_i$=(C(Ka, $R_{i-1}$) from the trigger memory 121, generates a periodical trigger signal, and sends it to the transmission unit 122. The transmission unit 122 repeatedly transmits the sent trigger signal via the antenna ANT2 (S140).

In order to detect radio waves from the control device 16, the detection unit 123 is always in a standby state (S141). Upon detecting the radio waves from the control device 16 (Yes in S141), the detection unit 123 activates the determination unit 124 by supplying power thereto, and sends the received information on the demodulated received signal to the determination unit 124. The determination unit 124 activates by receiving the supply of power, reads a calculated value C(Ka, $R_i$) stored in the calculated value memory 427 (S342), and compares the value with the received information received from the detection unit 123 (S143).

If they match as a result of comparison (Yes in S143), the determination unit 124 generates the driving signal CL and sends it to the electrically driven lock 31 (S144). Meanwhile, the transmission control unit 120 stops the transmission of trigger signal for a certain period of time (S644). The stop time corresponds to the timing given to the determination unit 411 by the timer 627 of the control device 16, and is set to be the time until when the control device 16 starts the update of the trigger signal and the calculated value.

After the predetermined stop time elapses, the transmission control unit 120 instructs the trigger updating unit 127 to update the trigger information $R_i$, and the trigger updating unit 127 writes the calculated value C (Ka, $R_i$) from the calculated value memory 427 used for the comparison in step 143 to the trigger memory 121 as trigger information $R_{i+1}$ to be used for the next time (S645). Accordingly, the trigger information in the trigger memory 121 is updated.

Subsequently, the transmission control unit 120 instructs the calculation unit 425 to generate a calculated value C (Ka, $R_{i+1}$) to be used for the determination regarding the correctness of the next response signal. The calculation unit 425 reads the updated trigger information $R_{i+1}$ from the trigger memory 121, generates the new calculated value C (Ka, $R_{i+1}$) using the key Ka stored in the key memory 426 (S646), and stores the value in the calculated value memory 427 (S647). When the new calculated value C is stored, the transmission control unit 120 reads the trigger information $R_{i+1}$ from the trigger memory 121 to generate the trigger signal, and resumes the repetitive transmission of the trigger signal (S648).

In the next operation, the transmission control unit 120 generates and transmits the trigger signal by reading the trigger information $R_{i+1}$ from the trigger memory 121, and the determination unit 124 determines whether the received information is from the correct control device by using the calculated value C (Ka, $R_{i+1}$) newly generated at this time.

According to the control system of this embodiment, since the transmission/reception of ACK signal is omitted, it is possible to simplify the circuit configuration.

Figure 20:
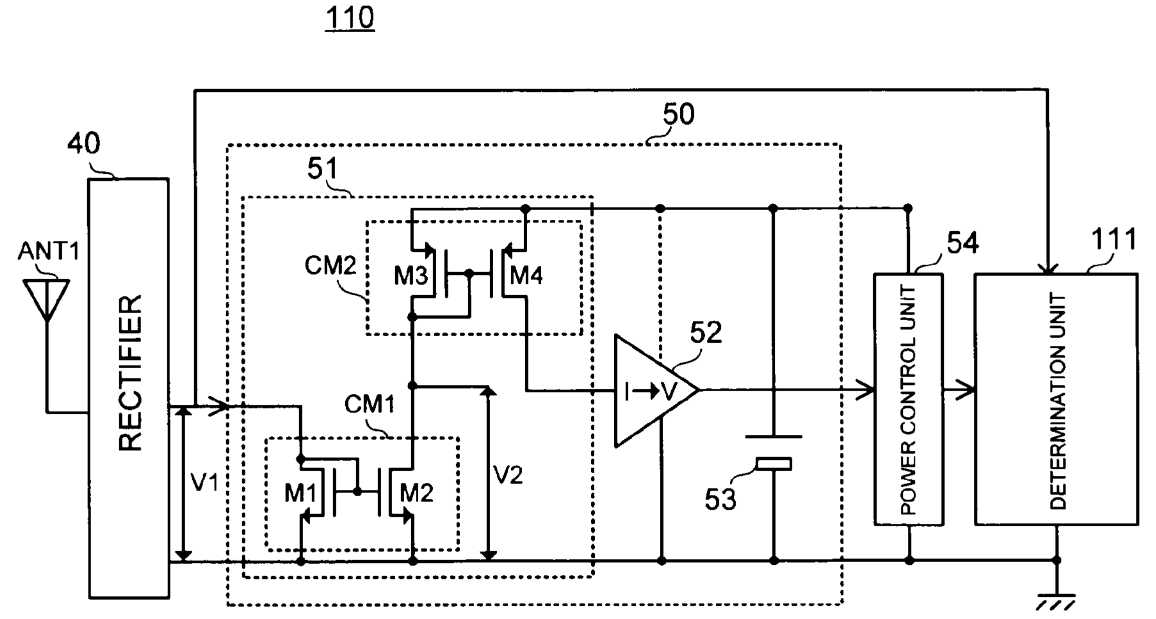
FIG. 20 is a view showing a configuration example of a detection unit of the control device according to the first to sixth embodiments of the present invention.

Subsequently, an example of detection unit used in the control device according to the first to sixth embodiments will be explained with reference to FIG. 20. As shown in FIG. 20, the detection unit 110 of these embodiments has a rectifier 40 and an activation circuit 50.

The rectifier 40 rectifies an RF signal output from the antenna ANT1 to generate a rectified voltage (direct-current voltage). Namely, the antenna ANT1 and the rectifier 40 form a power generation unit generating electric power by receiving energy from the outside. The rectifier 40 is realized by, for instance, a diode element or the like, and power supply to the rectifier 40 is not particularly necessary. However, there is a connection from the activation circuit 50 only to a ground thereof for a reference potential. The activation circuit 50 receives the rectified voltage output from the rectifier 40, and outputs an activation signal for the determination unit 111 and the like. The activation signal is supplied to a power control unit 54. Meanwhile, the rectifier 40 detects an RF voltage received from the antenna ANT1 and gives it to the determination unit 111. Specifically, the determination unit 111 is activated by the activation signal from the activation circuit 50, and performs a determination of trigger signal or response signal when receiving the signal from the rectifier 40.

The activation circuit 50 has a current generation unit and current amplification unit 51, a current-voltage converter 52, and a battery power supply 53. The current generation unit corresponds to an nMOS transistor M1, and a current is generated in the current generation unit when the rectified voltage output from the rectifier 40 is applied across a drain-gate common connection side and a source side of the transistor M1 with reference to the ground (reference potential or second reference potential). The current amplification unit corresponds to an nMOS transistor M2, pMOS transistors M3 and M4, in which a first stage of current amplification is conducted by the transistor M1 and the transistor M2 composing a current mirror circuit CM1 with the transistor M1, and a second stage of current amplification is conducted by a current mirror circuit CM2 composed of the transistor M3 and the transistor M4.

The amplified current being an output from the current generation unit and current amplification unit 51 is output from a drain of the transistor M4 and current-input into the current-voltage converter 52. The current-voltage converter 52 generates a voltage in accordance with the magnitude of the input current. A polarity from the current input to the output voltage can take either of a positive polarity and a negative polarity. Note that the reason why the ground side and the power supply (second reference potential or reference potential) side in the current-voltage converter 52 are respectively indicated by a solid line and a dotted line is that there may be a case where no connection at the power supply side is necessary. The battery power supply 53 functions as power supply of the activation circuit 50, and also functions as power supply of the power control unit 54 and the determination unit 111.

Basically, there is no power consumption from the battery power supply 53 in the activation circuit 50 under the state where no rectified voltage is input from the rectifier 40. This is because no current flows through the transistor M1 under the state where no rectified voltage is generated, resulting that the current does not flow through the current mirror circuits CM1 and CM2, and further, no current flows through the current-voltage converter 52 since the state thereof is fixed by, for example, a CMOS circuit or the like. Further, regarding the power consumption in the power control unit 54, the situation is the same as in the current-voltage converter 52. This is also because the power control unit 54 can be formed of, for example, a CMOS circuit or the like. The determination unit 111 is turned to be ON state by the activation signal being the output from the activation circuit 50 via the power control unit 54, and consumes from the battery power supply 53. The power control unit 54 supplies power to the determination unit 111 based on the activation signal. Namely, the power control unit 54 has a function of converting the activation signal into a voltage capable of driving the determination unit 111.

In the detection unit in this example, the received signal received by the antenna ANT2 is converted into a direct current by the rectifier 40, and is passed to the activation circuit 50 and the determination unit 111. The activation circuit 50 amplifies the received current using the current mirrors CM1 and CM2, and converts the current into a voltage using the current-voltage converter 52. The converted voltage is passed to the power control unit 54 as the activation signal, and the power control unit 54 supplies power to the determination unit 111 based on the activation signal. The determination unit 111 receiving the supply of power performs a determination regarding the received signal received from the rectifier 40.

In this example, a potential difference V1 between the rectifier 40 and the ground is made to be equal to a potential difference V2 between the current mirror circuit CM1 and the ground, so that no current flows when the rectifier 40 and the current mirror circuit CM1 are in OFF state, resulting that the power consumption in a standby state can be more effectively reduced. In the detection unit 110 of this embodiment, there is no power consumption in the standby state. This point becomes a great advantage in terms of power saving.

Note that it is also possible to provide, for instance, a set-reset flip-flop (SR flip-flop) to the output of the current-voltage converter 52 so that the ON state of the determination unit 111 can be maintained even if an incoming radio wave stops and the generation of activation signal is ceased. Such a kind of state recording circuit may also be provided inside the power control unit 54.

It should be noted that the present invention is not limited to the above-described embodiments as they are, but may be embodied with components being modified in a range not departing from the contents thereof at the stage of implementation. Further, various inventions can be formed by correctly combining a plurality of components disclosed in the above-described embodiments. For example, some of all the components shown in the embodiments may be deleted. Further, components ranging across different embodiments can be combined correctly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control device communicating with a controlled device to control the controlled device, comprising:

a first memory to store first authentication information configured to authenticate the controlled device;

a second memory to store second authentication information configured to enable the controlled device to authenticate the control device;

a detector to detect third authentication information transmitted by the controlled device;

a determination unit to compare the third authentication information detected by the detector with the first authentication information stored in the first memory;

a calculator to perform calculation processing on the first authentication information or the third authentication information using the second authentication information to generate a calculated value when the determination unit determines that the third authentication information and the first authentication information are matched;

a transmitter to transmit the calculated value to the controlled device; and a memory controller to update the first authentication information in response to receiving a confirmation signal sent from the controlled device in reply to the transmission of the calculated value to the controlled device, by replacing the first authentication information stored in the first memory with the calculated value.

2. The device according to claim 1, wherein the memory controller updates the first authentication information when the third authentication information is not received by the detector within a predetermined period of time after the transmission unit transmits the calculated value.

3. The device according to claim 1, further comprising:

a third memory to store the calculated value generated by the calculator, wherein the transmitter reads the calculated value from the third memory and transmits the value to the controlled device.

4. The device according to claim 3, wherein the calculator performs calculation processing on the first authentication information updated by the memory controller.

5. A controlled device to perform control in accordance with a control signal transmitted by a control device, comprising:

a first memory to store first authentication information for activating the control device;

a transmitter to repeatedly transmit the first authentication information stored in the first memory;

a second memory to store second authentication information configured to authenticate the control device;

a detector to detect third authentication information transmitted from the control device in reply to the first authentication information transmitted by the transmitter;

a calculator to generate a calculated value obtained by performing calculation processing on the first authentication information stored in the first memory using the second authentication information stored in the second memory when the detector detects the third authentication information;

a determination unit to compare the third authentication information detected by the detector with the calculated value so as to perform the control when the third authentication information and the calculated value match; and a memory controller to update the first authentication information stored in the first memory after the control is performed by replacing the first authentication information stored in the first memory with the calculated value.

6. The device according to claim 5, wherein the transmitter stops the repetitive transmission for a predetermined period of time, when the determination unit determines that the third authentication information and the calculated value match.

7. The device according to claim 5, further comprising a third memory to store the calculated value generated by the calculation unit, wherein the determination unit compares the third authentication information with the calculated value stored in the third memory.

8. The device according to claim 6, wherein the calculator performs calculation processing on the first authentication information updated by the memory controller.

* * * * *